US012662856B2

(12) United States Patent
Minnich

(10) Patent No.: US 12,662,856 B2
(45) Date of Patent: Jun. 23, 2026

(54) PAWL CONNECTOR FOR GLOVE BOX LATCH

(71) Applicant: Southco, Inc., Concordville, PA (US)

(72) Inventor: David A. Minnich, Lincoln University, PA (US)

(73) Assignee: Southco, Inc., Concordville, PA (US)

(*) Notice: Subject to any disclaimer, the term of this patent is extended or adjusted under 35 U.S.C. 154(b) by 9 days.

(21) Appl. No.: 18/568,128

(22) PCT Filed: Jun. 10, 2022

(86) PCT No.: PCT/US2022/032953
§ 371 (c)(1),
(2) Date: Dec. 7, 2023

(87) PCT Pub. No.: WO2022/261402
PCT Pub. Date: Dec. 15, 2022

(65) Prior Publication Data

US 2024/0263494 A1 Aug. 8, 2024

Related U.S. Application Data

(60) Provisional application No. 63/209,690, filed on Jun. 11, 2021.

(51) Int. Cl.
*E05B 83/30* (2014.01)
*E05C 9/04* (2006.01)
*E05C 9/20* (2006.01)

(52) U.S. Cl.
CPC ................ *E05B 83/30* (2013.01); *E05C 9/04* (2013.01); *E05C 9/20* (2013.01)

(58) Field of Classification Search
CPC .......... E05B 83/30; E05B 83/28; E05B 79/08; E05B 65/5261; E05B 85/00; E05B 77/36;
(Continued)

(56) References Cited

U.S. PATENT DOCUMENTS 5,586,795 A * 12/1996 Sasaki ..................... E05C 9/043
292/DIG. 31
7,455,333 B2 * 11/2008 Ookawara ............... E05B 83/30
292/34

(Continued)

FOREIGN PATENT DOCUMENTS

CN 101195360 A * 6/2008 ............. E05B 65/00
CN 109236070 A 1/2019

(Continued)

OTHER PUBLICATIONS

Notification Concerning Transmittal of the International Preliminary Report on Patentability (Forms PCT/IB/326 and PCT/IB/373) and the Written Opinion of the International Searching Authority (Form PCT/ISA/237) issued Dec. 21, 2023, by the International Bureau of WIPO in corresponding International Application No. PCT/US2022/032953. (7 pages).

(Continued)

*Primary Examiner* — Steven A Tullia
(74) *Attorney, Agent, or Firm* — Buchanan Ingersoll & Rooney PC

(57) ABSTRACT

A vehicle glove box latch and a method of assembling thereof is disclosed. The latch includes an actuator mounted for movement relative to the vehicle glove box; a rotor coupled to the actuator and mounted for rotation about a rotor axis; and a pawl coupled to the rotor and movable along a pawl axis angled relative to the rotor axis. An engagement portion of the pawl engages an opening in a vehicle in which the vehicle glove box is mounted. A coupling portion of the pawl defines a recess for receiving a detent of the rotor and resisting unintended separation of the detent from the recess in a recess direction. A retainer of the rotor is positioned to limit movement of the coupling portion in the direction of the rotor axis and to resist unintended (Continued)

separation of the coupling portion from the detent in the direction of the rotor axis.

20 Claims, 25 Drawing Sheets

(58) Field of Classification Search
CPC ... E05B 77/22; E05C 9/04; E05C 9/20; E05C 9/043; E05C 9/042; Y10T 292/0963; Y10T 292/0834; Y10T 292/084; Y10T 292/0977; Y10T 292/0969; Y10T 70/5235; Y10T 70/5558; Y10T 70/5554; Y10T 70/5544; B60R 7/04; B60R 7/06; B60R 2011/0005; Y10S 292/37
See application file for complete search history.

(56) References Cited

U.S. PATENT DOCUMENTS

| | | | | |
|---|---|---|---|---|
| 8,403,374 | B2 * | 3/2013 | Shimizu | E05C 9/04 292/141 |
| 8,590,351 | B2 | 11/2013 | Ookawara et al. | |
| 9,850,691 | B2 * | 12/2017 | Nakasone | E05C 9/041 |
| 10,077,584 | B2 * | 9/2018 | Hattori | F16H 19/02 |
| 10,435,921 | B2 * | 10/2019 | Nakasone | E05C 9/043 |
| 12,044,049 | B2 * | 7/2024 | Nakasone | E05B 79/06 |
| 12,203,297 | B2 * | 1/2025 | Nakasone | E05C 9/04 |
| 2004/0168487 | A1 | 9/2004 | Sawatani et al. | |
| 2009/0206625 | A1 | 8/2009 | Toppani et al. | |
| 2015/0008680 | A1 * | 1/2015 | Suzuki | E05B 63/20 292/32 |
| 2022/0341224 | A1 * | 10/2022 | Minnich | E05B 81/06 |
| 2023/0313577 | A1 * | 10/2023 | Ishii | E05C 9/10 292/33 |

FOREIGN PATENT DOCUMENTS

| | | | | | |
|---|---|---|---|---|---|
| CN | 110578432 | A | | 12/2019 | |
| DE | 10 2019 127 758 | A1 | | 4/2021 | |
| EP | 2090468 | A1 | | 8/2009 | |
| EP | 2653638 | A1 | * | 10/2013 | E05B 83/30 |
| EP | 3800311 | A1 | * | 4/2021 | B60R 7/04 |
| FR | 2 936 549 | A1 | | 4/2010 | |
| GB | 2275731 | A | * | 9/1994 | E05B 5/00 |
| JP | S55-165066 | U | | 11/1980 | |
| JP | H06-067742 | U | | 9/1994 | |
| JP | 3041564 | U | * | 9/1997 | E05C 9/04 |
| JP | 2004-210260 | A | | 7/2004 | |
| JP | 5003554 | B2 | * | 8/2012 | E05B 65/12 |
| JP | 2014-091947 | A | | 5/2014 | |
| KR | 19980052427 | U | * | 10/1998 | E05B 83/30 |
| KR | 2003-0076115 | A | | 9/2003 | |
| KR | 20040054573 | A | * | 6/2004 | E05B 83/30 |
| KR | 100880909 | B1 | * | 2/2009 | B60R 7/06 |
| KR | 101273132 | B1 | * | 6/2013 | E05B 83/30 |
| KR | 20150111619 | A | * | 10/2015 | E05B 83/30 |
| KR | 20180049406 | A | * | 5/2018 | E05B 79/14 |
| WO | 2010/038716 | A1 | | 4/2010 | |
| WO | WO-2012132546 | A1 | * | 10/2012 | E05B 63/22 |
| WO | 2016/163365 | A1 | | 10/2016 | |
| WO | WO-2017195557 | A1 | * | 11/2017 | B60R 7/06 |
| WO | 2018/008598 | A1 | | 1/2018 | |
| WO | 2019195303 | A2 | | 10/2019 | |

OTHER PUBLICATIONS

Office Action (Notice of Reasons for Refusal) issued Mar. 24, 2026, by the Japan Patent Office in corresponding Japanese Patent Application No. 2023-575815 and an English translation of the Office Action. (4 pages).

* cited by examiner

PAWL CONNECTOR FOR GLOVE BOX LATCH

CROSS-REFERENCE TO RELATED APPLICATIONS

This application is a U.S. National Phase application of PCT International Application No. PCT/US2022/032953, filed Jun. 10, 2022, which claims priority to U.S. Provisional Patent Application No. 63/209,690, filed on Jun. 11, 2021, titled "PAWL CONNECTOR FOR GLOVE BOX LATCH" both of which are incorporated by reference herein in their entireties for all purposes.

FIELD OF THE INVENTION

The present invention relates to the field of latches configured to provide a mechanical connection between adjacent components, and particularly to latch systems for securing automotive glove box or accessory compartment doors in the closed position.

BACKGROUND OF THE INVENTION

Automotive door closure systems, such as glove boxes and the like, typically include a housing, a door, and a latch that cooperates with one or more strikers to hold the door in the closed position to cover the housing. It has been found that there is a continuing need to improve upon or provide alternatives to existing door closure systems.

SUMMARY OF THE INVENTION

According to a first aspect of the present invention, a vehicle glove box latch for a vehicle glove box comprises an actuator, a rotor coupled to the actuator, and a pawl coupled to the rotor. The actuator is configured to be mounted for movement relative to the vehicle glove box. The rotor is configured to be mounted for rotation relative to the vehicle glove box about a rotor axis. The pawl includes opposing ends and is movable along a pawl axis angled relative to the rotor axis. One end of the opposing ends of the pawl includes an engagement portion configured to be engaged with an opening in a vehicle in which the vehicle glove box is mounted, and another end of the opposing ends of the pawl includes a coupling portion positioned for coupling the pawl to the rotor. The coupling portion of the pawl defines a recess open in a recess direction angled relative to the pawl axis and angled relative to the rotor axis. The rotor has a detent extending in a direction of the rotor axis and into the recess defined by the coupling portion of the pawl. The rotor also includes a retainer spaced from the detent and extending in a direction transverse to the rotor axis. The recess defined by the coupling portion of the pawl is shaped to receive the detent of the rotor and to resist unintended separation of the detent of the rotor from the recess in the recess direction. The retainer of the rotor is positioned to limit movement of the coupling portion of the pawl in the direction of the rotor axis and to resist unintended separation of the coupling portion of the pawl from the detent of the rotor in the direction of the rotor axis.

According to another aspect of the present invention, a method for assembling the vehicle glove box latch assembly comprises the steps of: orienting a pawl relative to a rotor such that the pawl is movable along a pawl axis angled relative to a rotor axis, one end of the opposing ends of the pawl including an engagement portion configured to be engaged with an opening in a vehicle in which the vehicle glove box is mounted, and another end of the opposing ends of the pawl including a coupling portion positioned for coupling the pawl to the rotor; orienting the coupling portion of the pawl with a recess open in a recess direction angled relative to the pawl axis and angled relative to the rotor axis; extending a retainer of the rotor in a direction transverse to the rotor axis; receiving a detent of the rotor in the recess defined by the coupling portion of the pawl and resisting unintended separation of the detent of the rotor from the recess in the recess direction; positioning the retainer of the rotor to limit movement of the coupling portion of the pawl in the direction of the rotor axis and resist unintended separation of the coupling portion of the pawl from the detent of the rotor in the direction of the rotor axis, thereby resisting unintended separation of the pawl from the rotor in the direction of the rotor axis and in the recess direction angled relative to the rotor axis.

BRIEF DESCRIPTION OF THE DRAWINGS

The above and other aspects and features of the present invention will become more apparent to those of ordinary skill in the art by describing in detail exemplary embodiments thereof with reference to the attached drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1A:
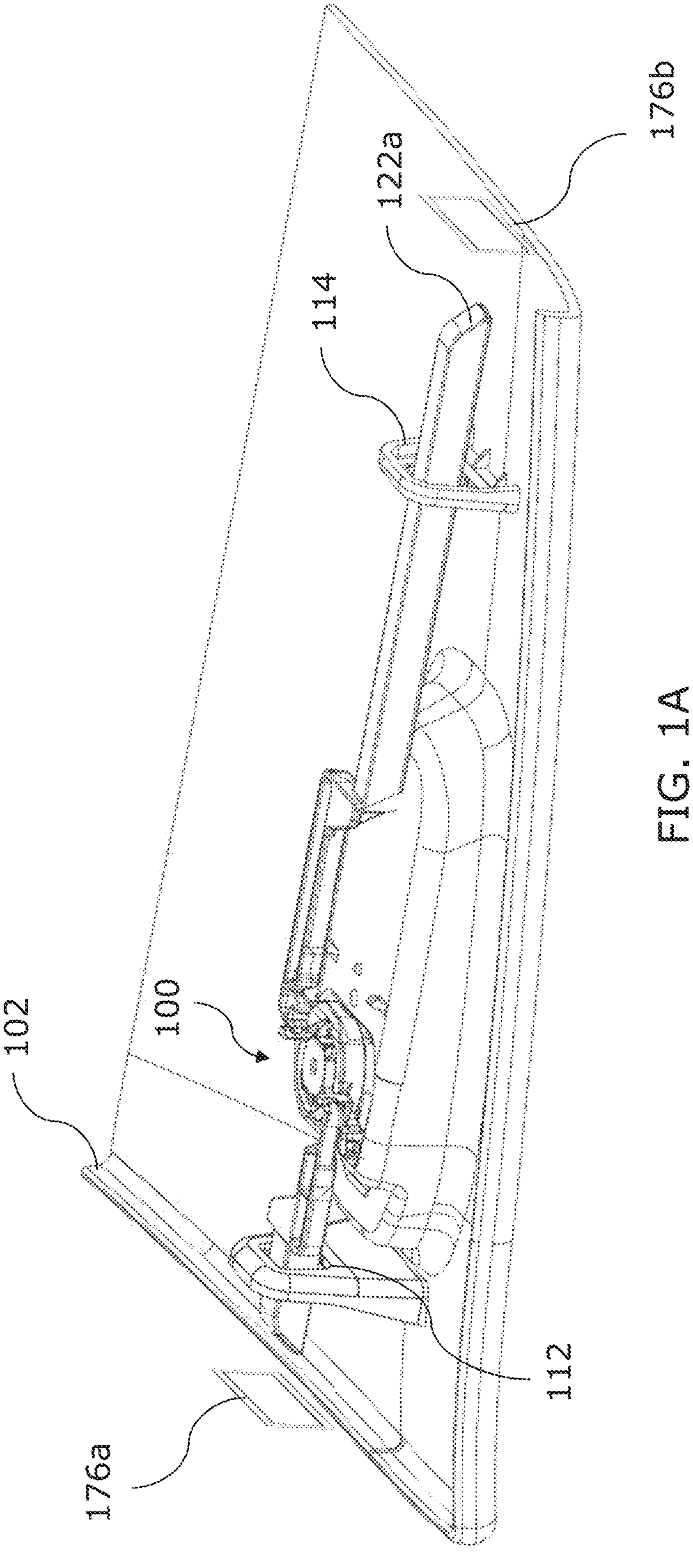
FIG. 1A depicts a perspective view a first exemplary embodiment of a vehicle glove box latch for a vehicle glove box, shown mounted to a door of the vehicle glove box.
Figure 1B:
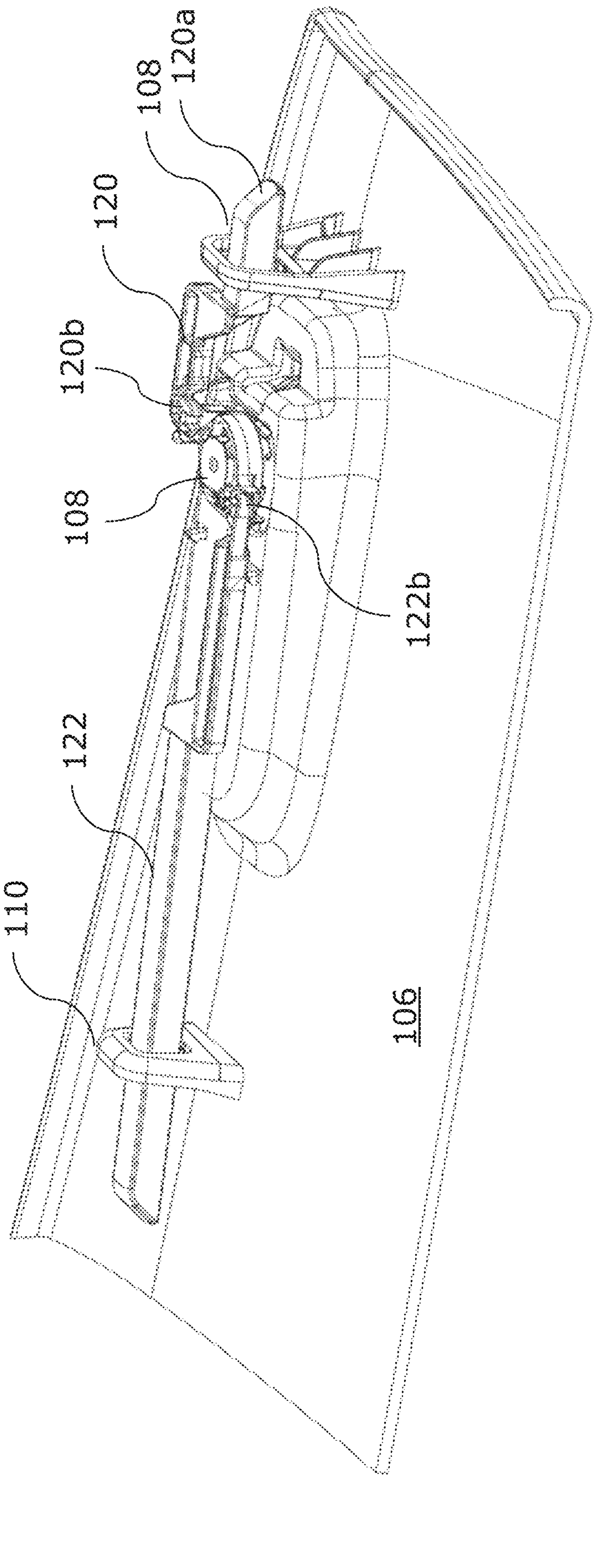
FIG. 1B depicts another perspective view of the vehicle glove box latch shown in FIG. 1A.

An embodiment of a vehicle glove box latch 100 for a vehicle glove box incorporating aspects of the present invention is disclosed. As seen in FIGS. 1A-1B, the vehicle glove box latch 100 is intended for unlatching or latching a door assembly having a door 102 (only the front panel of which is shown). The door 102 may be a glove box door for a vehicle, for example. Although not shown, the door 102 is mounted over an opening, such as an opening formed in a dashboard of a vehicle. The door 102 is hinged to the opening and can move between a closed position and an open position, as is known in the art.

In the closed position of the door 102, a front face (not shown) of the door 102 is flush with the surface of the dashboard. Opposite the front face is a rear face 106 of the door 102. In the open position of the door 102, the door 102 protrudes from the surface of the dashboard. Strikers (not shown) are provided at the perimeter of the opening of the dashboard. The door 102 may be a unitary component or composed of multiple components mounted together. The door 102 is generally rectangular in shape and includes the front face and the rear face 106. As seen in FIGS. 1A-1B, two projections 108 and 110 project outward in a rear facing direction from the rear face 106 of the door 102.

Figure 2A:
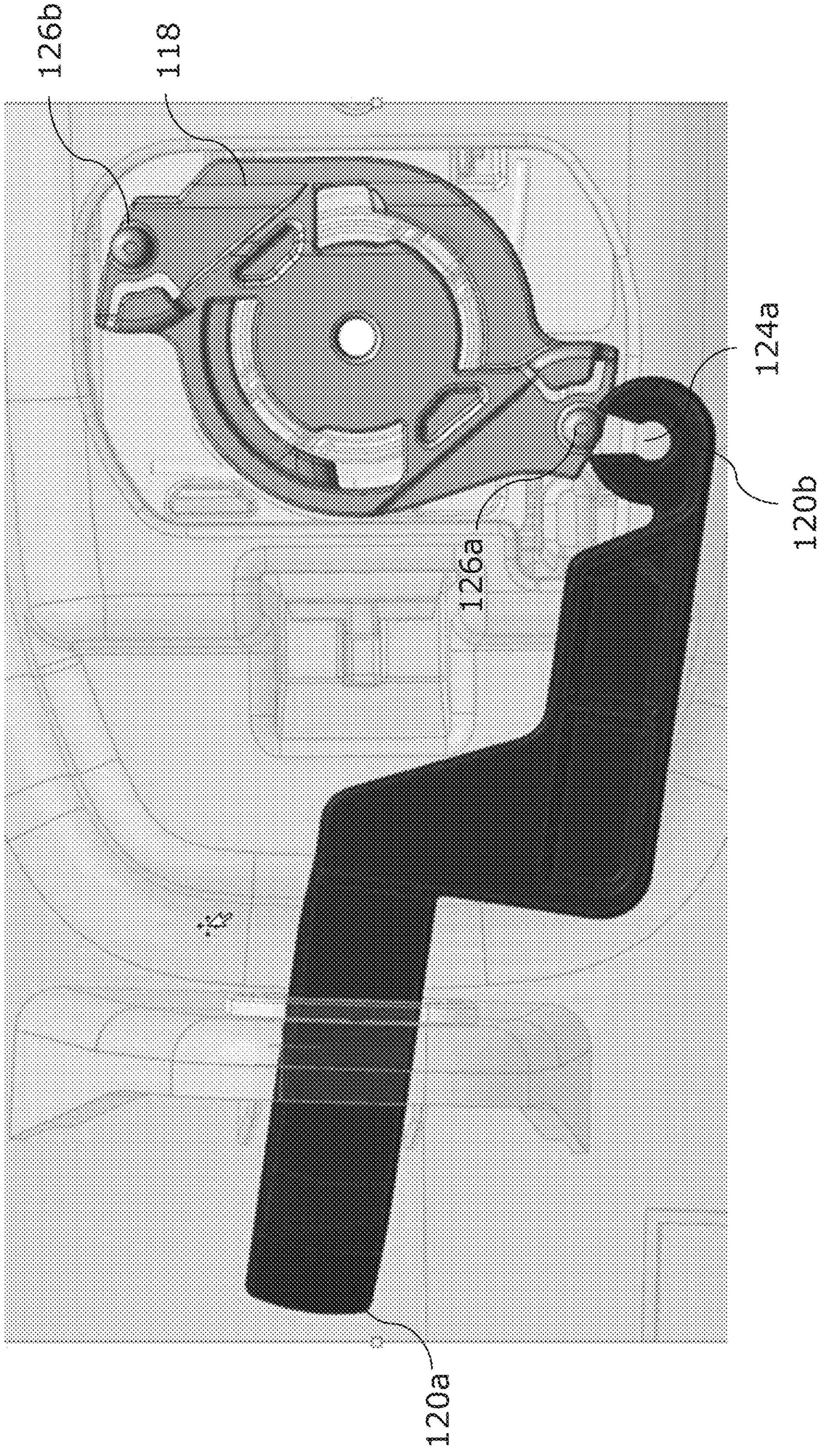
FIG. 2A is a top view of a pawl and a rotor of the vehicle glove box latch.
Figure 2B:
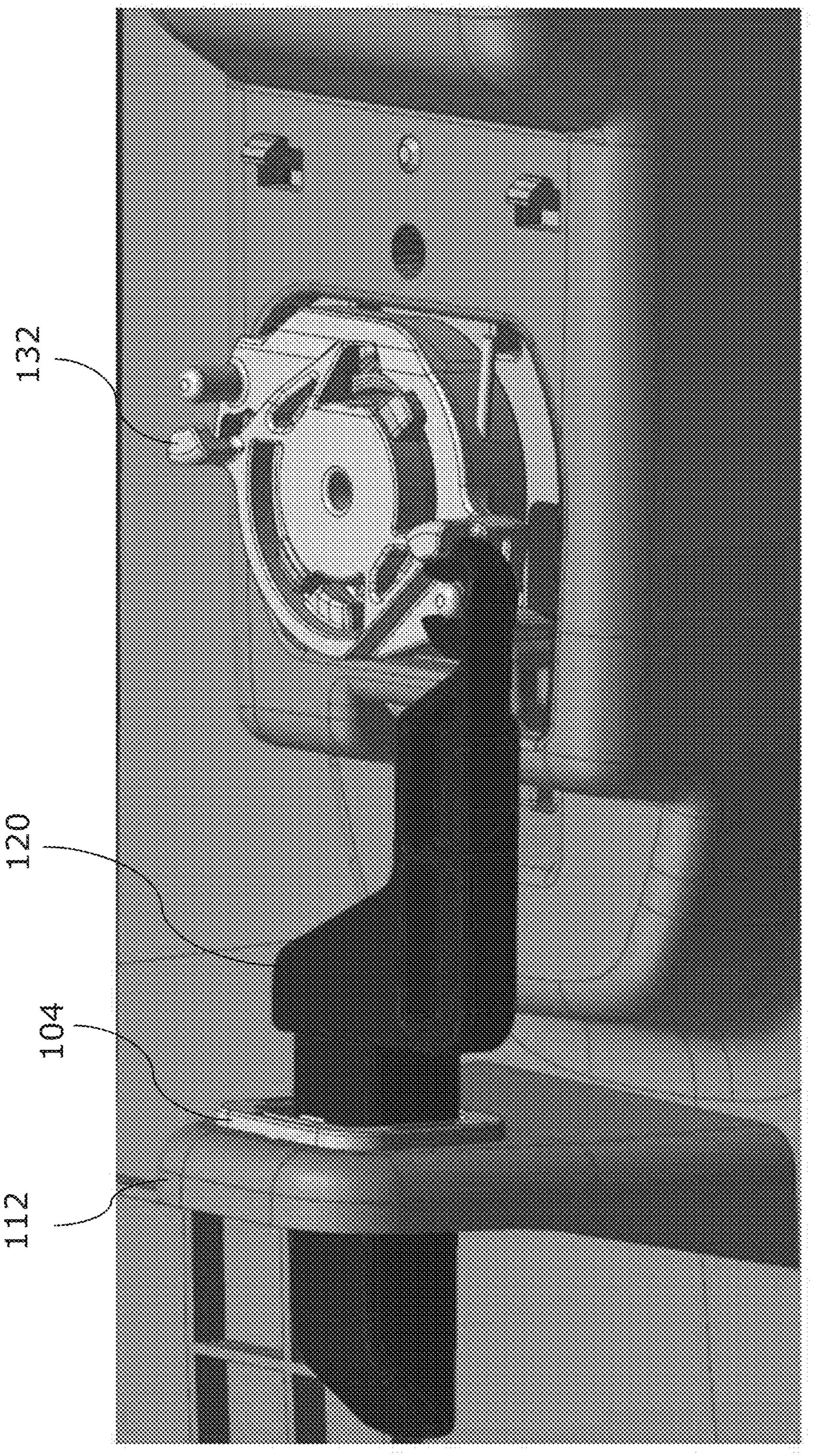
FIG. 2B is a perspective view of the pawl and the rotor shown in FIG. 2A.

Referring to FIGS. 2A-2B, the projections 108 and 110 each include an aperture 112 and 114, respectively, extending therethrough. Each interior facing side of the apertures 112 and 114 may include a clip 104 (FIG. 2B) having resilient tabs (not shown) that are capable of accommodating transverse motion of a pawl, such as pawls 120 and 122, that is positioned therein.

The vehicle glove box latch 100 is mounted to the door 102 to releasably retain the door 102 in the closed position. The vehicle glove box latch 100 is at least partially positioned within a recessed region (not shown) of the door 102 such that a front face 134 of an actuator, such as a user operated paddle 116 (FIGS. 8A-8G) of the vehicle glove box latch 100 is either flush with or slightly recessed with respect to the front face of the door 102. Alternatively, the paddle 116 may slightly protrude or significantly protrude, as dictated by the design. The vehicle glove box latch 100 may be mounted to the door 102 by a fastening means, such as a threaded fastener and a clip on a housing of the vehicle glove box latch 100.

It should be understood that the means for mounting the vehicle glove box latch 100 can vary. For example, the means for mounting may comprise a plurality of clips, a plurality of fasteners, a snap, a clamp, a weld, an adhesive, a barb, a slot, a prong, or a surface, for example, or any other device that can be used to mount the vehicle glove box latch 100 to the door 102.

The primary components of the vehicle glove box latch 100 for the vehicle glove box are the actuator 116, a rotor 118, and the pawl, such as pawls 120 and 122. It should be understood that the vehicle glove box latch 100 may only include one of pawls 120 and 122 or alternatively, the vehicle glove box latch 100 may include plural pawls 120 and 122. Optionally, the vehicle glove box latch 100 may include plural pawls comprising pawls 120 and 122.

Figure 3A:
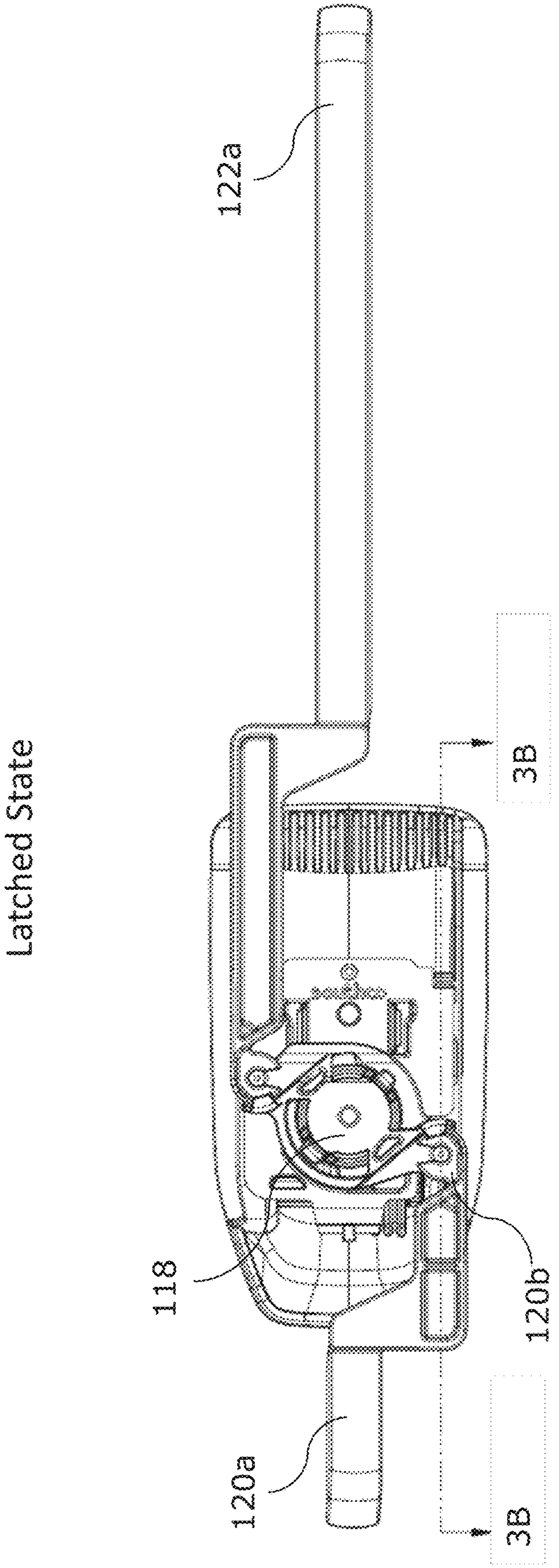
FIG. 3A is a top view of the vehicle glove box latch, wherein the vehicle glove box latch is shown in a latched state.

The actuator, such as user operated paddle 116 (FIG. 3D) is configured to be mounted for movement relative to the vehicle glove box. In particular, the paddle 116 is pivotably mounted with respect to the front face of the door 102 about a pivot axis. The rotor 118 is coupled to the paddle and configured to be mounted for rotation relative to the vehicle glove box about a rotor axis (FIG. 7H). In particular, the rotor 118 is rotatably mounted relative to the rear face 106 of the door 102 about a concentric axis.

Figure 5A:
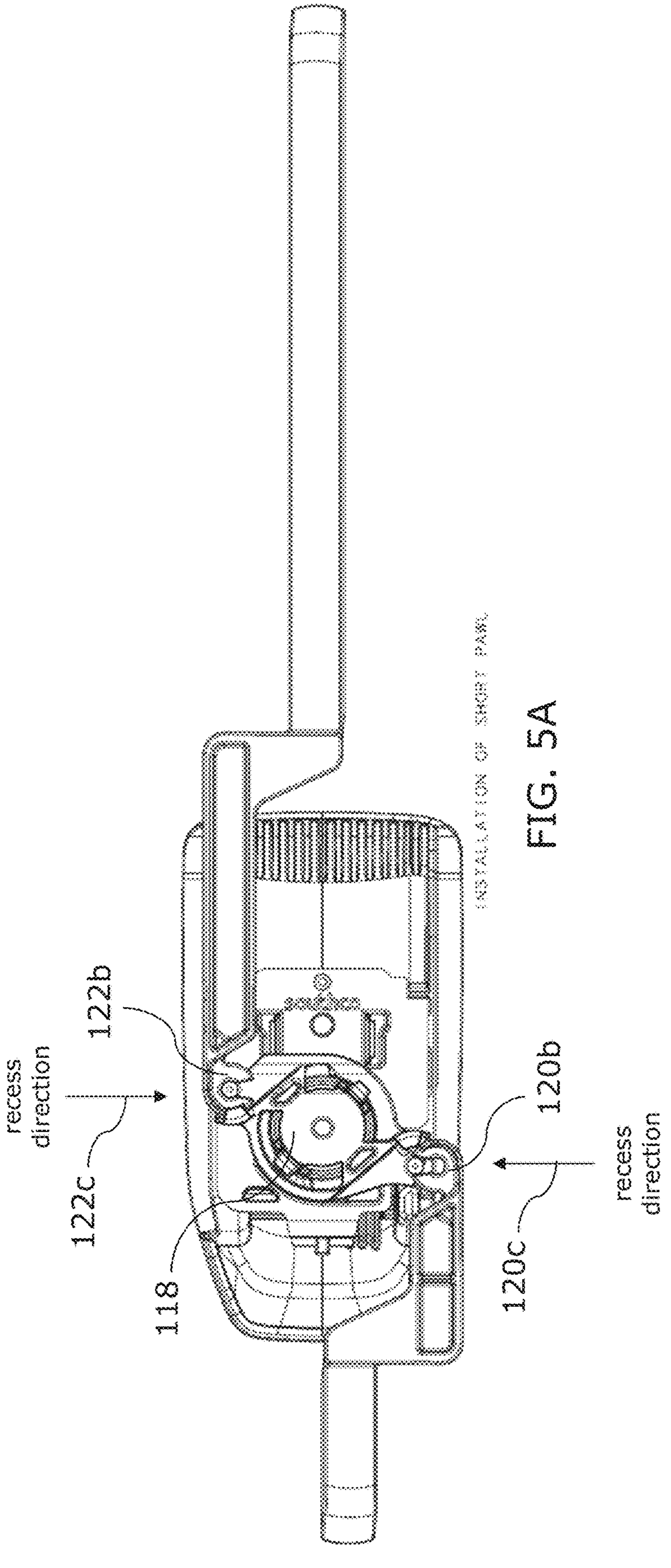
FIG. 5A is a top view of the vehicle glove box latch, showing a position of the pawl ready for installation.
Figure 5B:
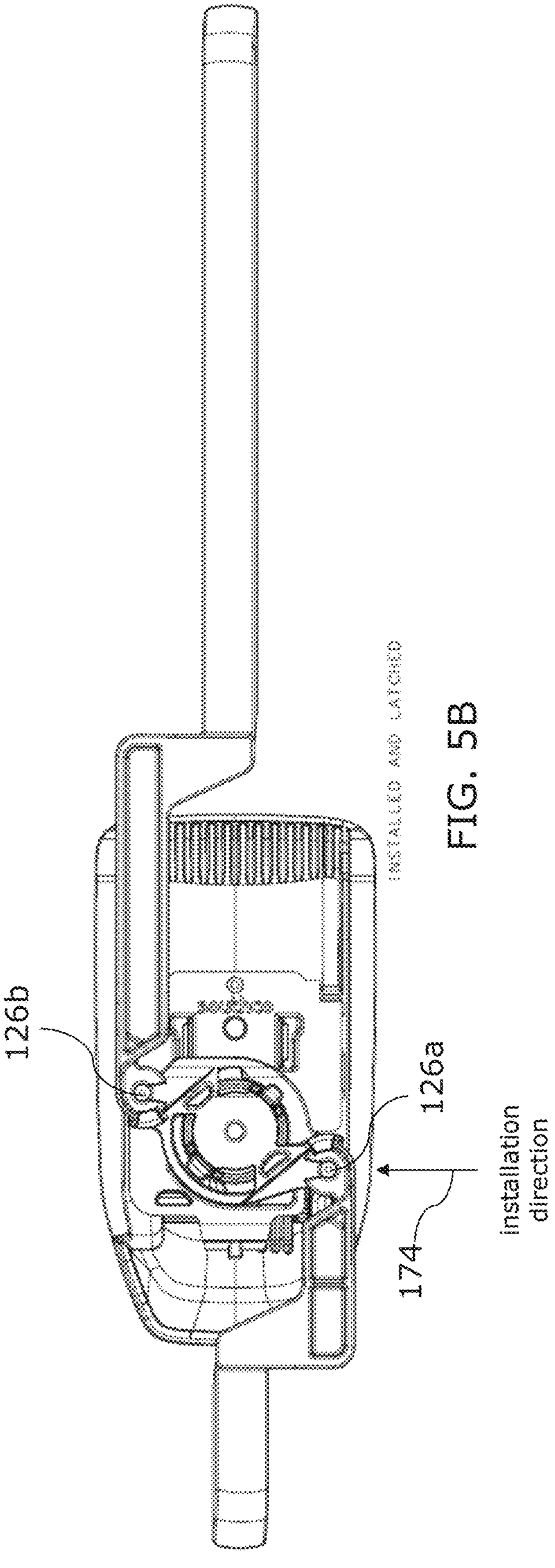
FIG. 5B is a top view of the vehicle glove box latch, showing the pawl as installed and in the latched state.

The pawls 120 and 122 are each configured to be coupled to the rotor 118. The pawls 120 and 122 each have opposing ends and are movable along a pawl axis angled relative to the rotor axis (FIG. 7H). In particular, as seen in FIG. 5D, pawl 120 travels along the pawl axis angled relative to the rotor axis (FIG. 7H) in a direction 120*d* and pawl 122 travels along the pawl axis angled relative to the rotor axis in a direction 122*d*. Furthermore, pawls 120 and 122 are movable along the pawl axis (FIG. 5D) between a latched position and an unlatched position.

One end of the opposing ends of the pawls 120 and 122 includes an engagement portion, such as free ends 120*a* and 122*a*, respectively, that are configured to be engaged with respective openings 176*a* and 176*b* (or collectively referred to as openings 176) in a vehicle in which the vehicle glove box is mounted. Another end of the opposing ends of the pawls 120 and 122 include a coupling portion, such as coupling portions 120*b* and 122*b*, that are positioned for coupling the pawls 120 and 122, respectively, to the rotor 118.

Additionally, or optionally, and although not illustrated explicitly in the figures, the vehicle glove box latch 100 may include one or more of a base housing and a lock barrel. The base housing is mountable to the front face of the door 102 and remains fixed in place (i.e., stationary) during operation of the vehicle glove box latch 100. The lock barrel (if provided) is mountable to the base housing and aligned with an opening 136 in the paddle 116. The lock barrel is provided for either locking or unlocking the vehicle glove box. The lock barrel is an optional component and may be omitted.

Further, although not illustrated explicitly in the figures, the vehicle glove box latch 100 may also include one or more bumpers or elastomeric components formed of a soft material. The one or more bumpers may be seated between the base housing and the paddle 116 to help mitigate noise, e.g. BSR (buzz, shake, rattle), during operation of the vehicle and conditions related to vibratory responses. Additionally, or optionally, the one or more bumpers may be seated between the base housing and a rear-facing face 164 of the paddle 116 in order to limit sound generation upon moving the paddle 116.

The latch 100 may include one or more springs, such as a torsion spring (not shown) connected to the paddle 116 for retaining the paddle 116 in a home position (discussed further below). A second torsion spring, such as torsion spring 150 (FIG. 9), may be connected to the rotor 118 for biasing the rotor 118 to a rotational position corresponding to the latched state of the vehicle glove box latch 100 (i.e., in which the pawls 120 and 122 are engaged with the strikers).

The individual components of the vehicle glove box latch 100 will now be described in greater detail.

The vehicle glove box latch 100 generally includes the user operated paddle 116, the rotor 118 and the at least one pawl 120, 122. In particular, as seen in FIGS. aA-1B, at least a portion of the vehicle glove box latch 100, including rotor 118 and two pawls 120 and 122, protrudes from the rear face 106 of the door 102. The pawls 120 and 122 each comprise an engagement portion configured to be engaged with the respective openings 176*a* and 176*b* (or collectively referred to as openings 176) in a vehicle in which the vehicle glove box is mounted. In an example, the pawls 120 and 122 each comprise the engagement portion configured to releasably engaged to the strikers on the vehicle opening. When the pawls 120 and 122 are engaged with the strikers, the door 102 is maintained in the closed state or position. Specifically, when the pawls 120 and 122 are each in the latched position (FIG. 5B), the pawls 120 and 122 are engaged with the strikers, thereby maintaining the door 102 in the closed state or position. More specifically, engagement between the engagement portion, such as free ends 120*a* and 122*a* of the pawls 120 and 122, respectively and their respective strikers when the pawls 120 and 122 are each in the latched position, prevents the door 102 from being moved to the open position from the closed state or position. Conversely, when the pawls 120 and 122 are in the unlatched position (FIG. 5C), the pawls 120 and 122 are configured to move away from and to be separated from their respective strikers, such that the pawls 120 and 122 are sufficiently disengaged from the strikers and the door 102 is not maintained in the closed state or position, or the door 102 can readily be moved to the open state or position. In other words, the engagement portions 120*a* and 122*a* are each not engaged with their respective strikers, such that the door 102 is not maintained in the closed state or position, or the door 102 can readily be moved to the open state or position.

Figure 4A:
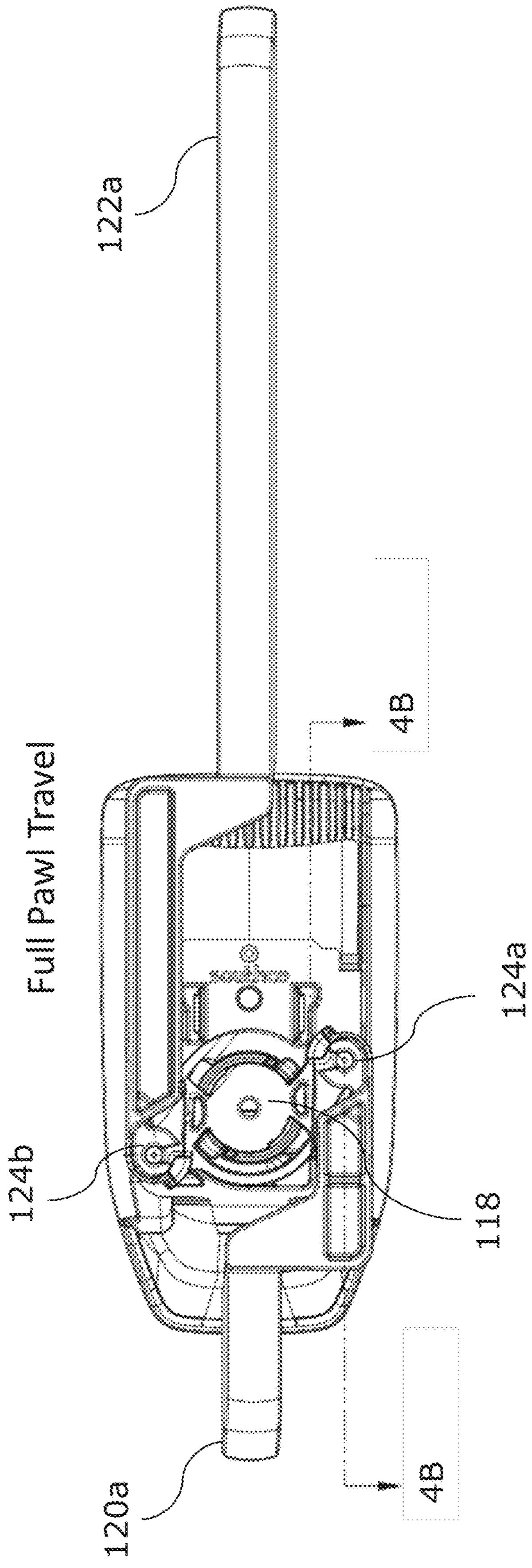
FIG. 4A is a top view of the vehicle glove box latch, showing a full travel distance of the pawl, such as an unlatched state.

As seen in FIGS. 6A-6L, opposite the free ends 120*a* and 122*a* of each of pawl 120 and 122 is a coupling portion 120*b* and 122*b* of each pawl 120 and 122. The coupling portions 120*b* and 122*b* each define a recess, such as recess 124*a* (FIG. 6B) and 124*b* (FIG. 4A), respectively. As illustrated in FIG. 5A, recess 124*a* of pawl 120 may be open in a recess direction 120*c* that is angled relative to the pawl axis (FIG. 5D) and is angled relative to the rotor axis (FIG. 7H). Likewise, recess 124*b* of pawl 122 may be open in a recess direction 122*c* that is angled relative to the pawl axis (FIG. 5D) and is angled relative to the rotor axis (FIG. 7H). In a non-limiting example, the coupling portions 120*b* and 122*b* of each of pawls 120 and 122 are positioned for coupling each pawl 120 and 122 to the rotor 118.

In particular, the coupling portions 120*b* and 122*b* define recesses 124*a* and 124*b* that have a shape and size intended to receive one of detents 126*a* and 126*b* (discussed further below) of the rotor 118 and to resist unintended separation of the detents 126*a* and 126*b* of the rotor from the recesses 124*a* and 124*b*, respectively, in the recess direction (FIG. 5A). In a non-limiting example, coupling portions 120*b* and 122*b* comprise crescent shaped recesses 124*a* and 124*b* (referred to either individually or collectively as recess(es) 124) that are defined on the perimeter of each of the coupling portions 120*b* and 122*b*.

Figure 6B:
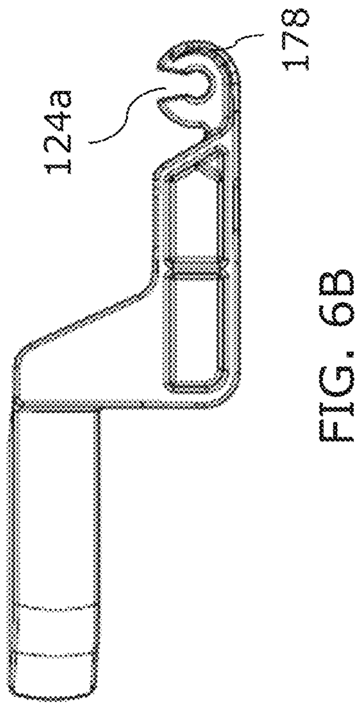
FIGS. 6A, 6B, 6C, 6D, 6E, and 6F depict views of an embodiment of the pawl of the vehicle glove box latch.
Figure 6D:
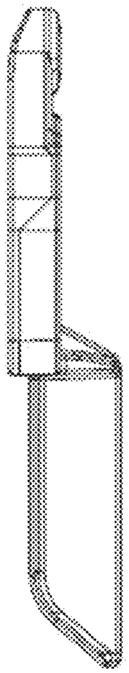
Figure 6A:
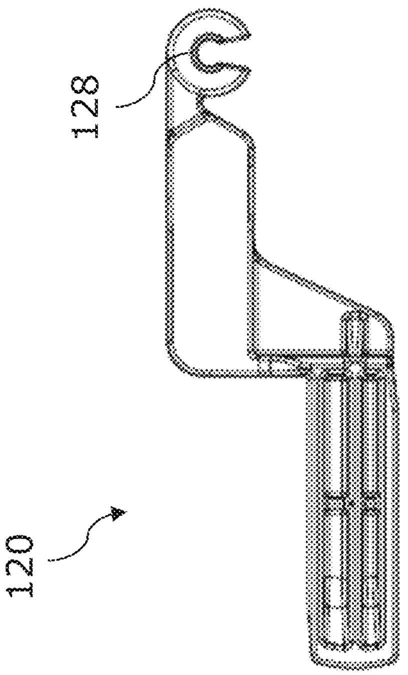
Figure 6C:
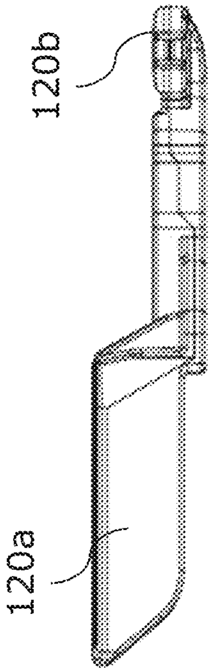

Specifically, each recess 124 is defined by a C-shaped clip having a non-continuous perimeter. As seen in FIG. 6A, the non-continuous perimeter defines an opening 128 through which the detents 126*a* and 126*b* can be inserted or snapped into the C-shaped clip (according to one method of mating the detent 126*a* with coupling portion 120*b* and detent 126*b* with coupling portion 122*b*). Stated differently, each of recess 124*a* and 124*b* is configured to be releasably coupled to one of detents 126*a* and 126*b* defined by rotor 118, respectively. The detents 126*a* and 126*b* are capable of pivoting within the recesses 124 during operation without becoming detached from the recesses 124.

In order for the recess 124 of the pawls 120 and 122 to resist unintended decoupling or separation from the rotor 118, the size of the respective opening 128 of the recess 124 may be selected to be smaller than the size or diameter of the detents 126*a* and 126*b* of the rotor 118. Deflection of the recess 124 thereby permits receipt or insertion of the detents 126*a* and 126*b* within the recess 124 upon exertion of an insertion force, as indicated by installation direction 174 (FIG. 5B). Resulting interference between the respective opening 128 of the recess 124 and the detents 126*a* and 126*b* resists unintended separation of the detents 126*a* and 126*b* from the recesses 124*a* and 124*b*, respectively, yet permits intended separation by exertion of a separation force opposite to the insertion force 174 (for disassembly or service, for example).

Although FIGS. 6A-6L illustrate the coupling portion 120*b* as having crescent shaped recess 124*a* (and coupling portion 122*b* may have a substantially similar crescent shape recess 124*b*), it will be understood from the description herein that the coupling portions 120*b* and 122*b* may have any geometry depending at least on the size and shape of the detents 126*a* and 126*b*. Further, the shape of the coupling portions 120*b* and 122*b* may be symmetrical or asymmetrical as dictated by design or function. For example, the shape of the coupling portions 120*b* and 122*b* may be selected to accommodate or adjust installation and retention forces related to the assembly of the latch 100. In a non-limiting example, the shape of the coupling portions 120*b* and 122*b* may vary from what is illustrated, such as for example in FIGS. 6A-6L, based on increasing or decreasing the curved or angular portion of the crescent shape of the recesses 124. The coupling portions 120*b* and 122*b* may also be designed to have a shape and size, such that one side of the crescent shape of the recesses 124 presents no retention while the other side provides such retention. Still further, the C shape of the recesses 124 could comprise limited contact arcs (similar to an E Clip for example) to vary or control the amount and locations of contact between the recesses 124 and other components of the latch 100, such as detents 126*a* and 126*b*. Such limited or controlled contact arcs may indicate limited zones that may be used for a reduced contact effect and/or stress mitigation during assembly and installation or operation of the latch 100.

As a non-limiting example, the coupling portions 120*b* and 122*b* of the pawls 120 and 122 may each have a rounded surface positioned for contact with the rotor 118, thereby reducing the area of direct contact between the pawls 120 and 122 and the rotor 118. Even further, a surface of the recess 124 of the coupling portions 120*b* and 122*b* of the pawls 120 and 122 are rounded to reduce the area of direct contact between the recess 124 of the coupling portions 120*b* and 122*b* of the pawls 120 and 122 and the detents 126*a* and 126*b* of the rotor 118.

Figure 4C:
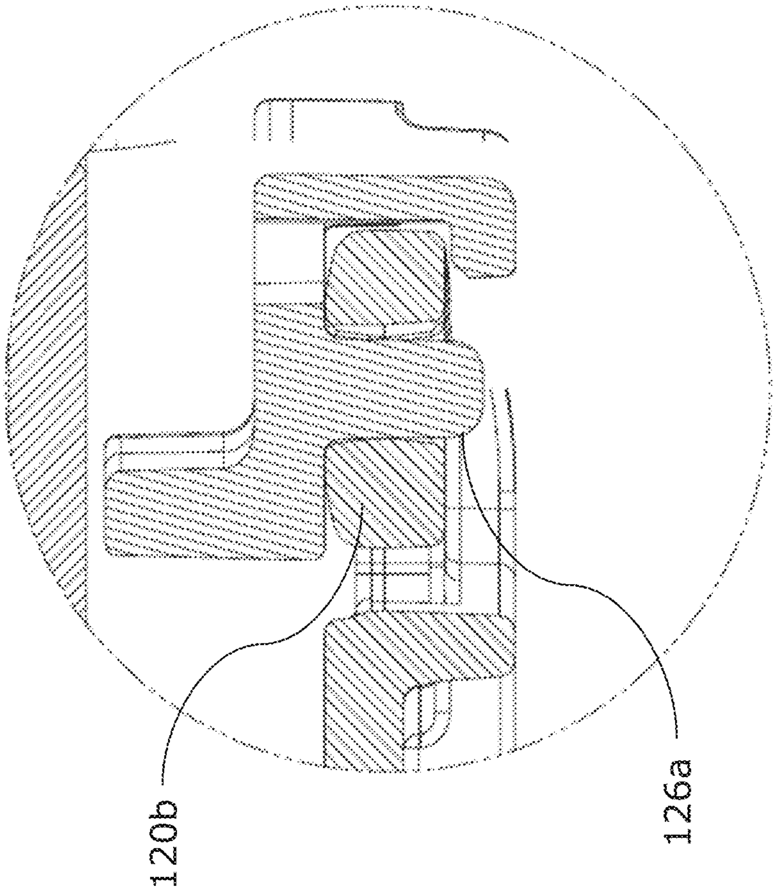
FIG. 4C is a detailed view of a portion of FIG. 4B.
Figure 4B:
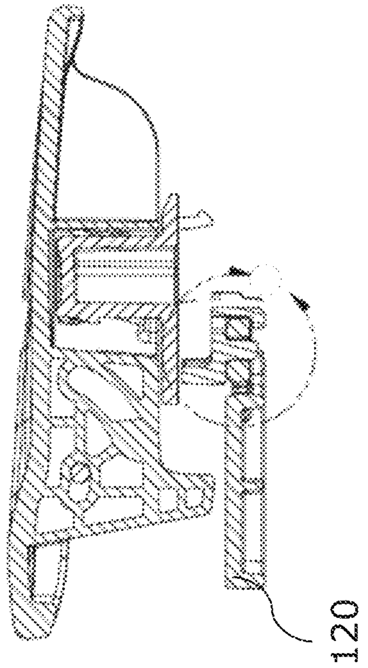
FIG. 4B is a cross-sectional view of the unlatched state of the vehicle glove box latch of FIG. 4A, taken along the line 4B-4B.
Figure 4E:
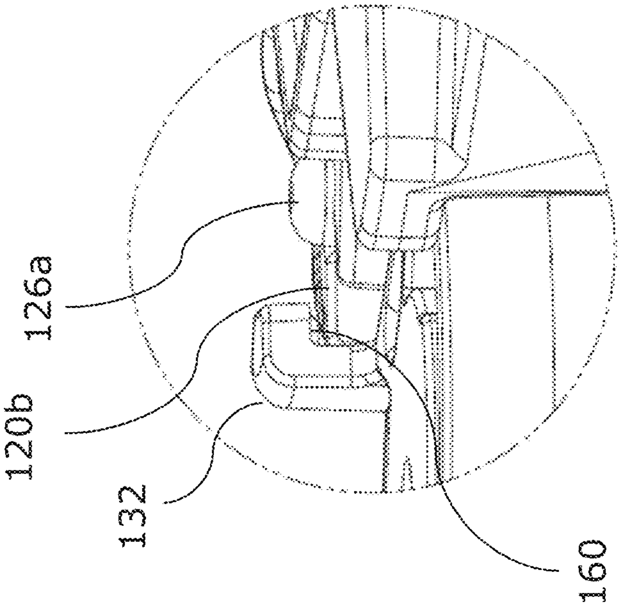
FIG. 4E is a detailed view of a portion of FIG. 4D.
Figure 4D:
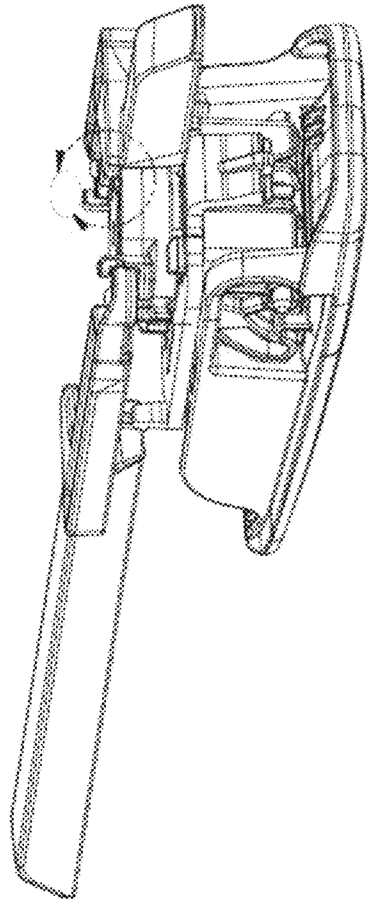
FIG. 4D is a perspective view of the vehicle glove box latch in the unlatched state.

Further, as best seen in FIG. 4C, the coupling portion 120*b* of the pawl 120 includes a tapered thickness, such that a distance between the coupling portion 120*b* of the pawl 120 and a contact surface 160 of a retainer 132 (discussed below) of the rotor 118 is greater in the unlatched position of the pawl 120 (FIG. 5C) relative to a distance between the coupling portion 120*b* of the pawl 120 and the contact surface 160 of the retainer 132 in the latched position of the pawl 120 (FIG. 5B).

Figure 3C:
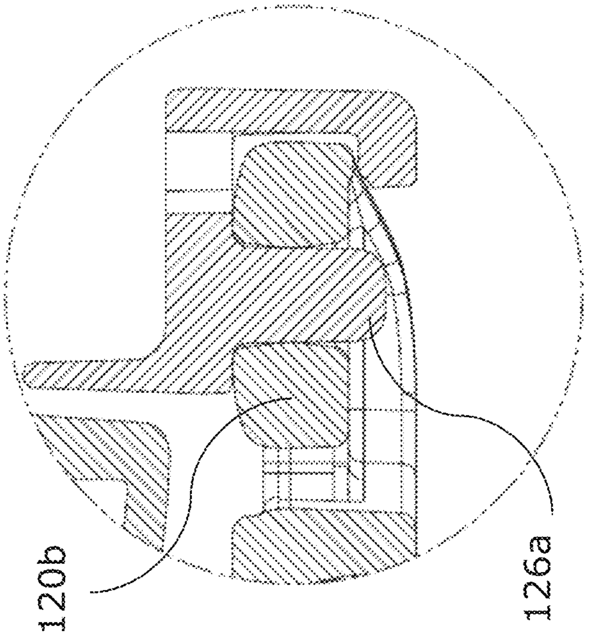
FIG. 3C is a detailed view of a portion of FIG. 3B, showing a recess defined by a coupling portion of the pawl that is shaped to receive a detent of the rotor.

In a non-limiting example, the tapered thickness of the pawl 120 can be seen when comparing the view of FIGS. 3C and 4C, which respectively show the distance of the coupling portion 120*b* of the pawl 120 and the contact surface 160 of retainer 132 of the rotor 118, which is smaller in an orientation of the pawl 120 when the latch 100 is in a latched state (FIG. 3C) as compared to the distance of the coupling portion 120*b* of the pawl 120 and the contact surface 160 of retainer 132 of the rotor 118 in another orientation of the pawl 120 when the latch 100 is in an unlatched and maximum pawl travel state (FIG. 4C). The tapered thickness of the coupling portion 120*b* may be indicated by a raised surface extending from an exterior surface of a portion of the coupling portion 120*b*.

Figure 6G:
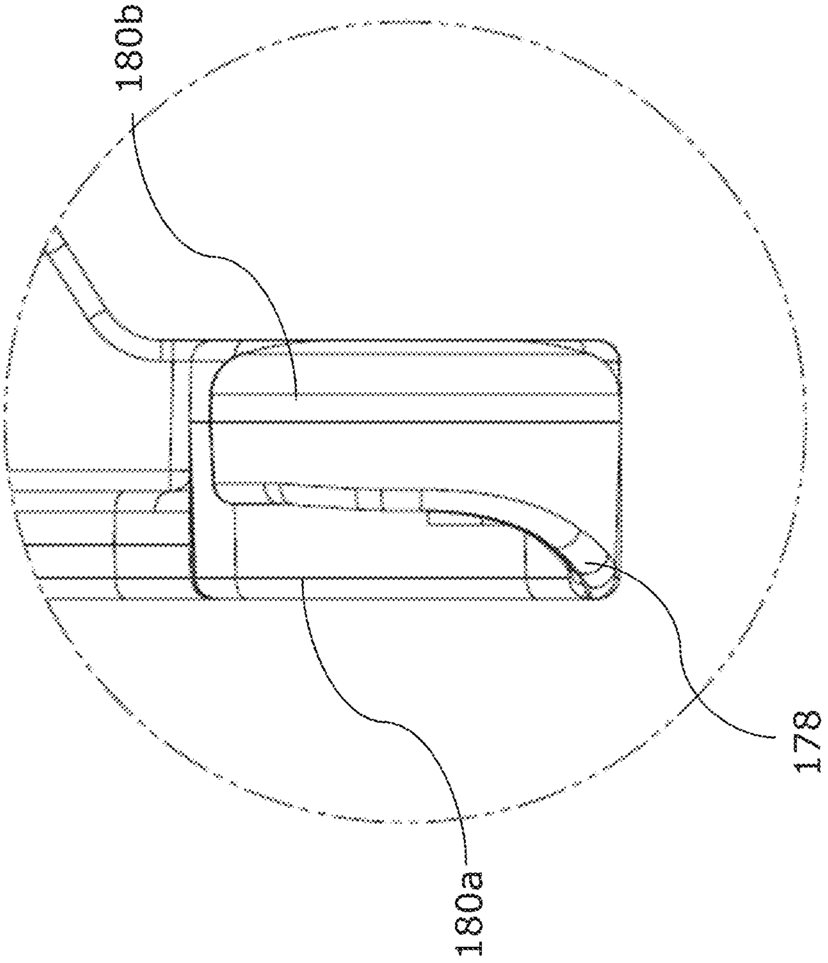
FIG. 6G is a detailed view of a portion of FIG. 6F.
Figure 6E:
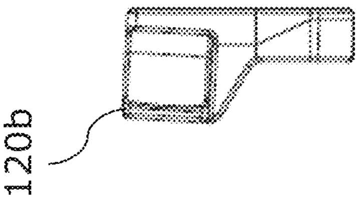
Figure 6F:
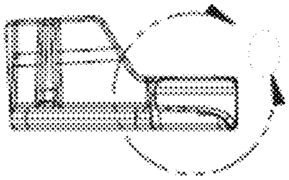
Figure 6I:
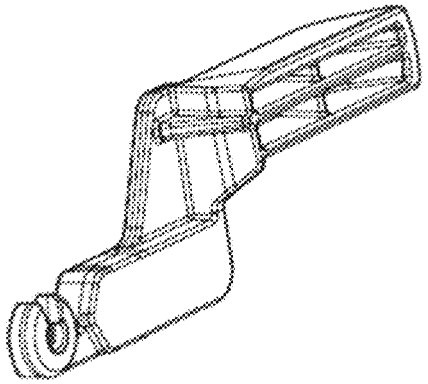
FIGS. 6H, 6I, 6J, 6K depict additional views of the pawl.
Figure 6J:
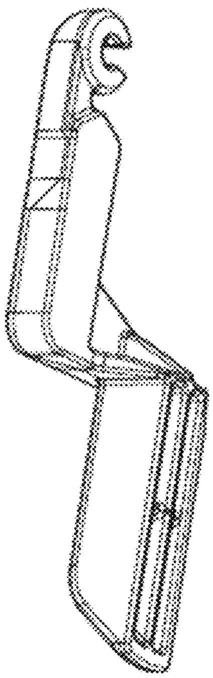
Figure 6H:
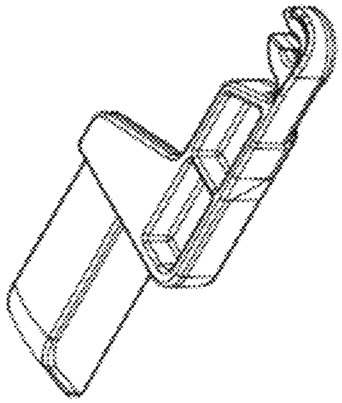
Figure 6L:
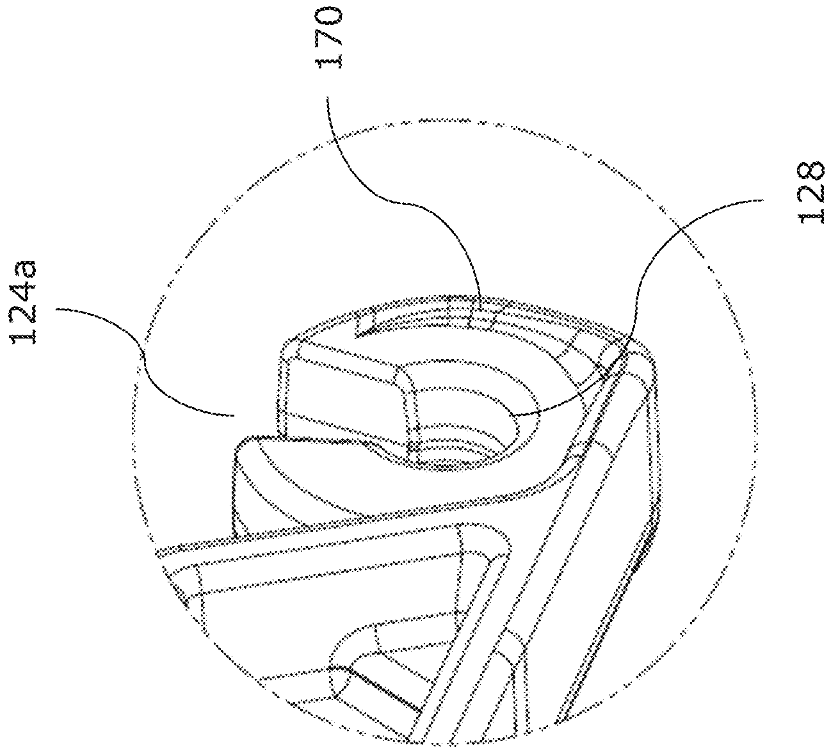
FIG. 6L is a detailed view of a portion of FIG. 6K.
Figure 6K:
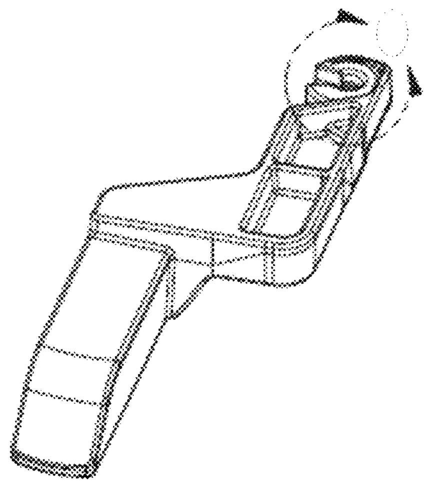

In another example, the tapered thickness of the pawl 120 is indicated by a ramp 178 extending from a surface of the coupling portion 120*b* of the pawl 120. As seen in FIG. 6B, the ramp may have a curved shape. Further, as illustrated in FIG. 6G, the ramp 178 may extend from a relatively thicker portion 180*a* of the coupling portion 120*b* of the pawl 120 to a relatively thinner portion 180*b* of the coupling portion 120*b* of the pawl 120. The degree of this taper (FIG. 6G) can be varied to allow for a greater or lesser gap as dictated by design and function. For example, the tapered thickness of the pawl 120 can be configured to operate at any point along the travel, such as that defined by the ramp 178. Additionally, or optionally, the degree of this taper (FIG. 6G) may be configured to establish an area of intimate contact between the recesses 124 and respective detents 126*a* and 126*b* by creating controlled drag and inducing a deceleration of motion during operation of the latch 100.

Although not explicitly illustrated, it should be understood from the description herein that the tapered thickness of the pawl 122 may be substantially similar in shape, size, design, and function, as described above for the pawl 120.

The movement of the vehicle glove box latch 100 between a latched state, an unlatched state, and an unlatched and maximum pawl travel state, will be discussed further below.

Specifically, the tapered thickness of the pawls 120 and 122 is intended to mitigate noise creation as caused or dictated by relative motion of the components of the latch 100 at certain conditions relevant to a vehicle, e.g. a moving vehicle, or to alleviate any noise creation caused by high frequency use cycles of the vehicle glove box, e.g. repeated movement between opening and closing the vehicle glove box via unlatching and latching the vehicle glove box latch 100. For example, the tapered thickness of the pawls 120 and 122 permit the ability to create a zone wherein the relative movement of the components of latch 100 is moved toward or maintained at a minimum for limiting the creation of vibratory induced contact noise. As stated above, this feature also allows for an arrangement of intimate contact over one or more specific zones or sections, thereby eliminating all relative motion at that zone (and that zone can be positioned at any point or points along the motion or over the entire motion if desired). Additionally, or optionally, this intimate contact over one or more specific zones or sections could be configured to damp the motion and potentially slow the reaction and movement of the pawls 120 and 122 between the latched or unlatched positions or states.

As best seen in FIGS. 7A-7L, the rotor 118 has generally circular geometry and comprises detents 126*a* and 126*b*, each detent 126*a* and 126*b* being respectively connected to the coupling portions 120*b* and 122*b* of the pawls 120 and 122. The detents 126*a* and 126*b* of the rotor 118 extends in a direction of the rotor axis (FIG. 7H) and into the recesses 124 defined by the coupling portions 120*b* and 122*b* of the pawls 120 and 122. In a non-limiting example, each of the detents 126*a* and 126*b* of the rotor 118 is a stud extending in the direction of the rotor axis (FIG. 7H). In particular, each of the detents 126*a* and 126*b* may be a cylindrical post.

The rotor 118 comprises plural detents, such as one or more of detents 126*a* and 126*b*, each extending in the direction of the rotor axis (FIG. 7H) and into the recess 124 defined by the coupling portions, such as coupling portions 120*b* and 122*b*, of a respective one of the plural pawls, such as pawls 120 and 122. Further, the rotor 118 may also have plural retainers, such as retainers 132*a* and 132*b*, each of which is spaced from a respective one of the plural detents 126*a* and 126. Each of the plural retainers 132*a* and 132*b* extend in the direction transverse to the rotor axis (FIG. 7H).

Referring to FIGS. 5A-5D, the detent 126*a* of the rotor 118 is mounted within the recess 124*a* of the pawl 120. The detent 126*b* of the rotor 118 is mounted within the recess 124*b* of the pawl 122. As will discussed below, the detents 126*a* and 126*b* can be inserted into their respective recesses 124 along the respective recess directions 120*c* and 122*c* (FIG. 5A). The mated orientation of the detents 126*a* and 126*b* in their respective recesses 124 prevents the detents 126*a* and 126*b* from inadvertently becoming detached from their recesses 124 in the recess direction (FIG. 5A).

The rotor 118 is movable about the rotor axis (FIG. 7H) between a latched position and an unlatched position. In the latched position (FIG. 5B), the detent 126*a* of the rotor 118 and is oriented toward the left direction relative to the detent 126*b* of the rotor 118. The rotor 118 moves toward the unlatched position as the pawls 120 and 122 move along the pawl axis (FIG. 5D) in their respective directions 120*d* and 122*d*. In the unlatched position (FIG. 5C), the detent 126*b* of the rotor 118 is oriented toward the right direction relative to the detent 126*b* of the rotor 118.

Although not explicitly shown, it should be understood that the detent 126*a* of the rotor 118 may be substantially identical to the detent 126*b* of the rotor 118. Optionally, the detent 126*a* may vary in size and shape from the detent 126*b*, as dictated by at least design of pawls 120 and 122. It should be understood that the connection between the pawls 120 and 122 and the rotor 118 may be any type of connection (fixed or releasable), and is not limited to the connection that is shown. For example, the direction of the installation, or connection between the pawls 120 and 122 and rotor 118, may vary from the installation direction 174 (FIG. 5B). This can be achieved by varying the location of the respective openings 128 or the recesses 124, as each defined by the coupling portions 120*b* and 122*b*.

The rotor 118 further defines a respective retainer 132*a* and 132*b* (collectively referred to as retainer(s) 132) spaced from the detent 126*a* and 126*b* and extending in a direction transverse to the rotor axis (FIG. 7H). In particular, the retainer 132 of the rotor 118 is positioned to limit movement of the coupling portions 120*b* and 122*b* of the pawls 120 and 122. Specifically, the retainer 132*a* of the rotor 118 is positioned to limit movement of the coupling portion 120*b* of the pawl 120 and the retainer 132*b* of the rotor 118 is positioned to limit movement of the coupling portion 122*b* of the pawl 122.

Figure 7D:
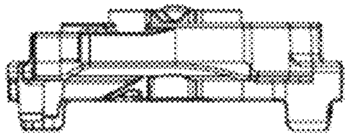
FIGS. 7A, 7B, 7C, 7D, 7E, and 7F depict views of an embodiment of the rotor of the vehicle glove box latch.
Figure 7B:
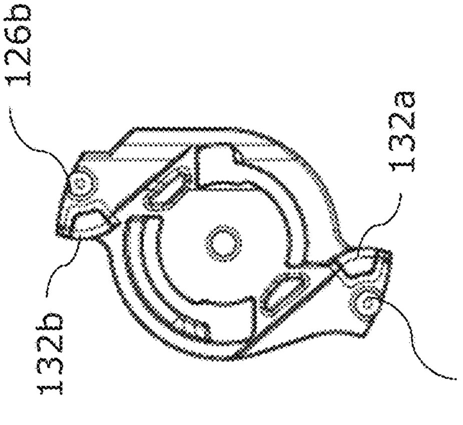
Figure 7C:
Figure 7A:
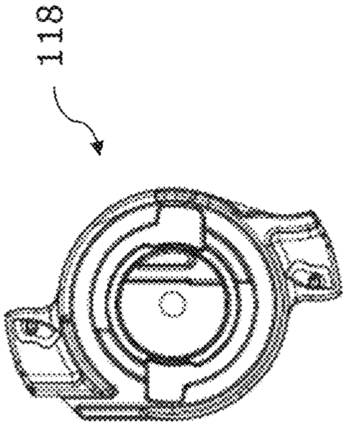
Figure 7G:
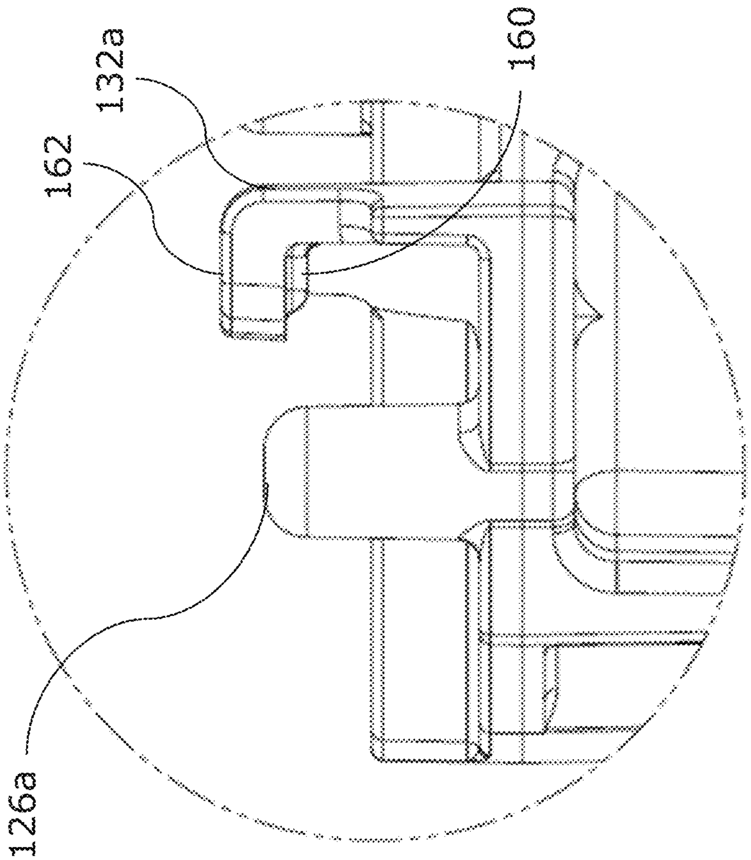
FIG. 7G is a detailed view of a portion of FIG. 7F.
Figure 7E:
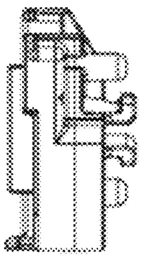
Figure 7F:
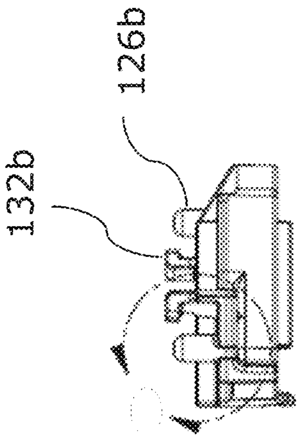
Figure 7J:
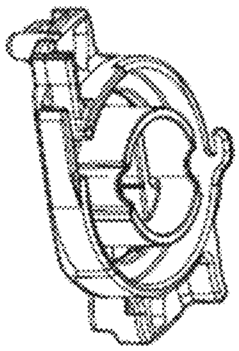
FIGS. 7H, 7I, 7J, 7K depict additional views of the rotor.
Figure 7I:
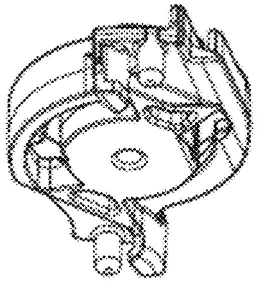
Figure 7H:
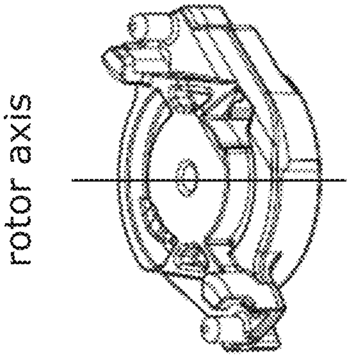
Figure 7L:
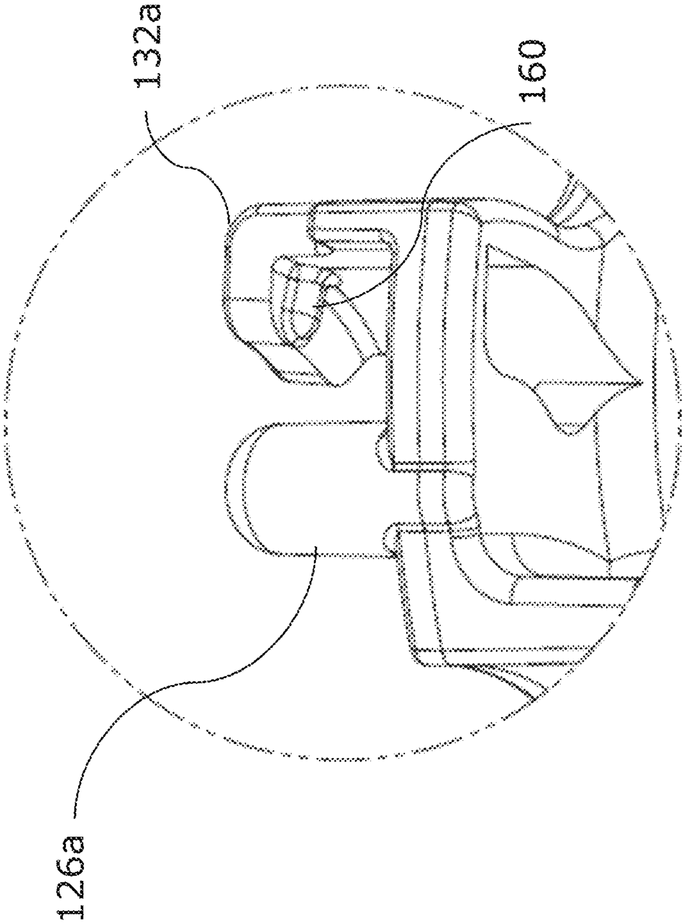
FIG. 7L is a detailed view of a portion of FIG. 7K.
Figure 7K:
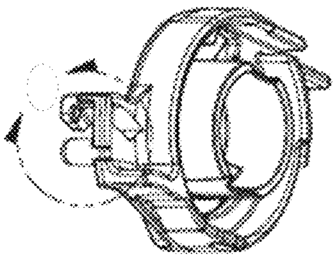
Figure 8C:
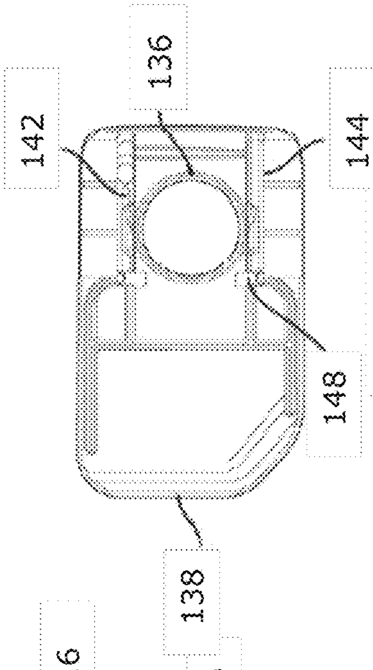
FIGS. 8A-8G depict views of an embodiment of an actuator of a vehicle glove box latch.
Figure 8B:
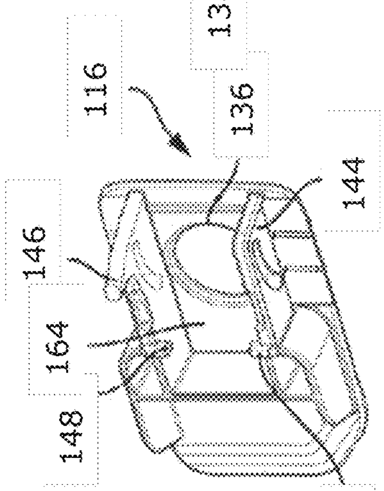
Figure 8A:
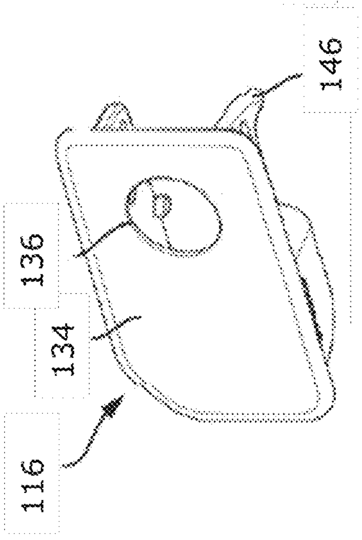
Figure 8G:
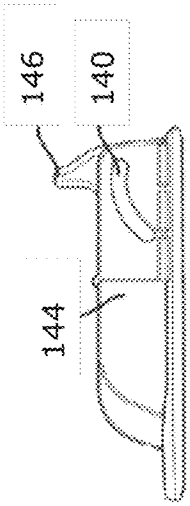
Figure 8F:
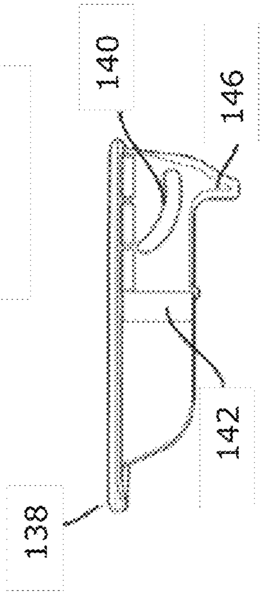
Figure 8E:
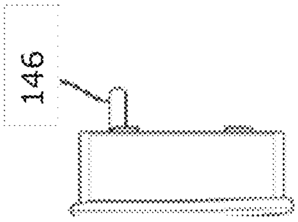
Figure 8D:
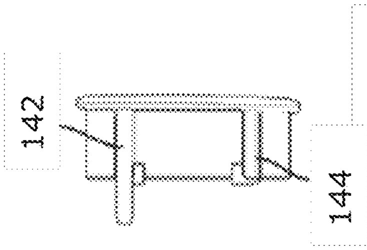

As best seen in FIGS. 7G and 7L, the retainer 132 of the rotor 118 is positioned to limit movement in the direction of the rotor axis (FIG. 7H) and to resist unintended separation of the coupling portions 120*b* and 122*b* of the pawls 120 and 122 from the detents 126*a* and 126*b*, respectively, of the rotor 118 in the direction of the rotor axis (FIG. 7H). In a non-limiting example, the retainer 132 of the rotor 118 is positioned to limit movement of the coupling portions 120*b* and 122*b* via a flange or lip 162, each defined by retainers 132*a* and 132*b*. The lip 162 is configured to extend in a direction transverse to the rotor axis (FIG. 7H), thereby limiting movement in the direction of the rotor axis (FIG. 7H). The lip 162 is further configured to resist unintended separation of the coupling portions 120*b* and 122*b* of the pawls 120 and 122 from the detents 126*a* and 126*b*, respectively.

Additionally, or optionally, the retainer 132 includes contact surface 160, which is positioned to be proximal to or contacting the coupling portions 120*b* and 122*b* of the pawls 120 and 122. In an example, contact surface 160 of each of retainers 132*a* and 132*b* are movable relative to the coupling portion 120*b* of the pawl 120 and coupling portion 122*b* of the pawl 122, when the rotor 118 is moved about the rotor axis (FIG. 7H) between the latched position of the rotor 118 and the unlatched position of the rotor 118. The contact surface 160 may have a size, shape, or general geometry configured to limit movement of the coupling portions 120*b* and 122*b* in the direction of the rotor axis (FIG. 7H) and to resist unintended separation of the coupling portions 120*b* and 122*b* from the detents 126*a* and 126*b*, respectively, of the rotor 118. In a non-limiting example, the contact surface 160 may define protrusions that are configured to be proximal to, make contact with, or extend closer to, a portion of the coupling portions 120*b* and 122*b*.

Various prior art latch designs include detents or posts on the one or more pawls that are coupled to recesses defined by the rotor (i.e., opposite to that of the arrangement of the detents and recesses in the vehicle glove box latch 100). Positioning the detents 126*a* and 126*b* on the rotor 118 and the recesses 124 on the pawls 120 and 122 for receiving the detents 126*a* and 126*b* provides the ability to mitigate BSR (buzz, shake, rattle) effects caused by relative motion of installed parts at certain conditions or inadequate attachments of the installed parts, including installed parts related to glove box latches for vehicles. It is desirable to mitigate or decrease BSR effects for consumer satisfaction with the product. This arrangement also provides easy assembly of the vehicle glove box latch 100, which will be further discussed below. Still further, the arrangement of the detents and recesses in latch 100 provides the benefit of avoiding conditions that may over-constrain the latch assembly because the arrangement allows for the pawl axis to be skewed to a limited degree relative to the rotor axis.

FIGS. 8A-8G depict an exemplary actuator, such as paddle 116, of the vehicle glove box latch 100. The paddle 116 includes a substantially rectangular front face 134 in the form of a wall. The opening 136 for accommodating an optional lock barrel may be defined in the face 134. The end 138 of the front face 134 furthest from the slots 140 is configured to be grasped by a user of the vehicle glove box latch 100. Opposing side walls 142 and 144 protrude downwardly from the front face 134. The side wall 142 includes one of the two slots 140, and a rounded leg 146 extending downwardly from the wall 142 at a location adjacent the slot 140. The rounded leg 146 is configured for rotating the rotor 118. One of the two posts 148 extends inwardly from the bottom edge of the side wall 142 toward the side wall 140. The side wall 144 includes the other of the two slots 140. The other of the two posts 148 extends inwardly from the bottom edge of the side wall 144 toward the side wall 142. Each post 148 may be positioned within a housing in an assembled form of the vehicle glove box latch 100.

Figure 9:
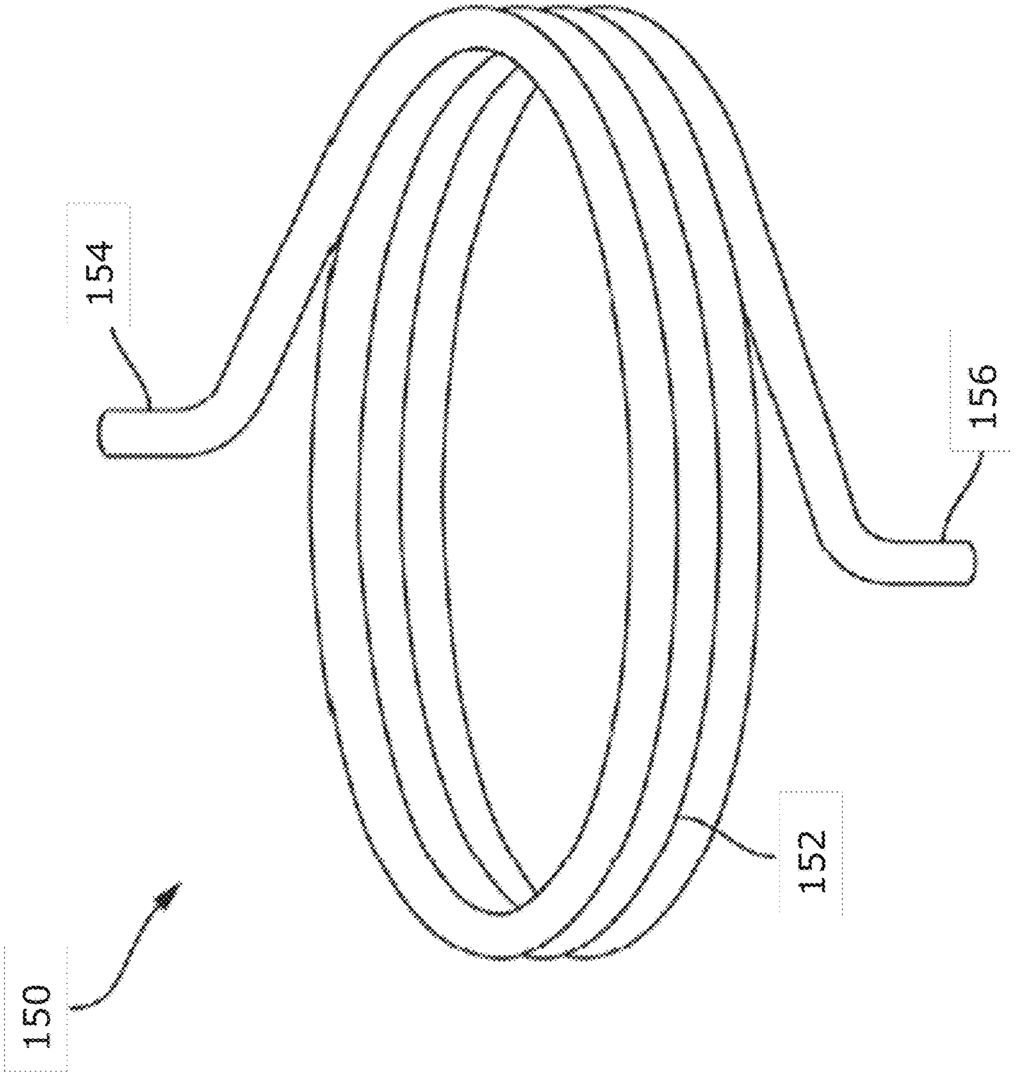
FIG. 9 is an isometric view of a torsion spring of a vehicle glove box latch.

FIG. 9 depicts an exemplary torsion spring 150 of the vehicle glove box latch 100. The torsion spring 150 is connected to the rotor 118 for biasing the rotor 118 to a rotational position corresponding to the latched state of the vehicle glove box latch 100 (i.e., in which the pawls 120 and 122 are engaged with the strikers).

The torsion spring 150 includes a coiled body 152 having two free ends 154 and 156. The free ends 154 and 156 extend in opposite directions along separate axes that are each oriented parallel to a central axis of the coiled body 152. In a non-limiting example, an assembled form of the vehicle glove box latch 100 includes the coiled body 152 of the spring 150 as being mounted in an annular recess that is formed on the front side of the rotor 118.

Referring now to FIGS. 3A-3E, 4A-4E, and FIGS. 5A-5D, the movement of the latch 100 from the latched state, unlatched state, and the unlatched state and maximum pawl travel state is disclosed.

In the latched state (FIGS. 3A-3E and 5B) of latch 100, the door 102 to the vehicle glove box is in the closed position. As explained above, the torsion spring 150 may be connected to the rotor 118 for biasing the rotor 118 to a rotational position corresponding to the latched state of the vehicle glove box latch 100 (i.e., in which the pawls 120 and 122 are engaged with the strikers). The torsion spring 150 prevents the rotor 118 from rotating in the counterclockwise direction, such as direction 168 in FIG. 5C, due to the engagement between the coupling portions 120*b* and 122*b* having recesses 124 and the detents 126*a* and 126*b* of the rotator 118.

Figure 3B:
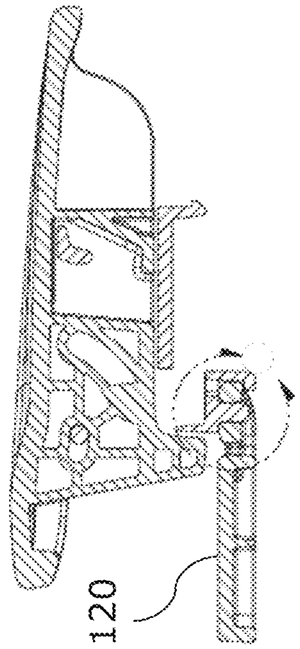
FIG. 3B is a cross-sectional view of the latched state of the vehicle glove box latch of FIG. 3A, taken along the line 3B-3B.
Figure 3E:
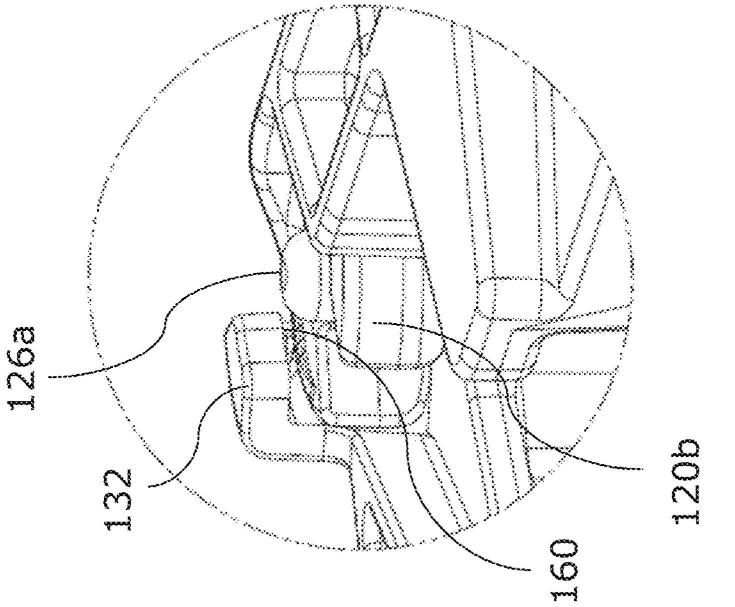
FIG. 3E is a detailed view of a portion of FIG. 3D.
Figure 3D:
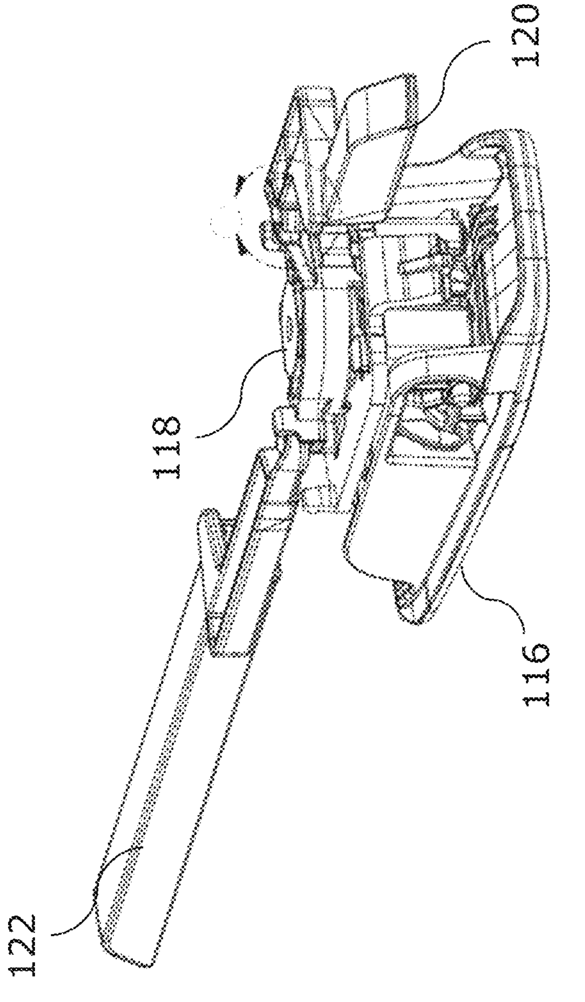
FIG. 3D is a perspective view of the vehicle glove box latch in the latched state.

Particularly, as seen in FIGS. 3A-3C, the detents 126*a* and 126*b* are received by the respective recesses 124 of the coupling portions 120*b* and 122*b* of the pawls 120 and 122. The shape of the recesses 124 permit the coupling portions 120*b* and 122*b* to secure at least the detents 126*a* and 126*b*, respectively, by resisting unintended separation of at least the detents 126*a* and 126*b* from the respective recesses 124 in the recess direction (FIG. 5A).

Additionally or optionally, the retainer 132 is spaced a distance from one of detents 126*a* and 126*b* and is positioned to limit movement of the coupling portions 120*b* and 122*b* of the pawls 120 and 122 in the direction of the rotor axis (FIG. 7H) and to resist unintended separation of the coupling portions 120*b* and 122*b* of the pawls 120 and 122 from one of the detents 126*a* and 126*b*, respectively, of the rotor 118 in the direction of the rotor axis (FIG. 7H).

Turning now to FIGS. 5C and 8A-8G, the latch 100 is moved to the unlatched state by way of operating the actuator, such as paddle 116. In a non-limiting example, the user rotates the paddle 116 against the biasing operation of a biasing means, such as a cantilever spring (not shown) coupled to the paddle 116. The contact between the rotator 118 and the cantilever spring allows the rotator 118 to be retained in the latched position. Optionally, the user rotates the paddle 116 in an outward direction against the biasing operation of a biasing means, such as a torsional spring (not shown), which is connected to the paddle 116 for retaining the paddle 116 in the home position. In the home position of the paddle 116, the rear-facing surface 164 of the paddle 116 faces (and is a parallel with) the front face of the door 102.

Figure 5C:
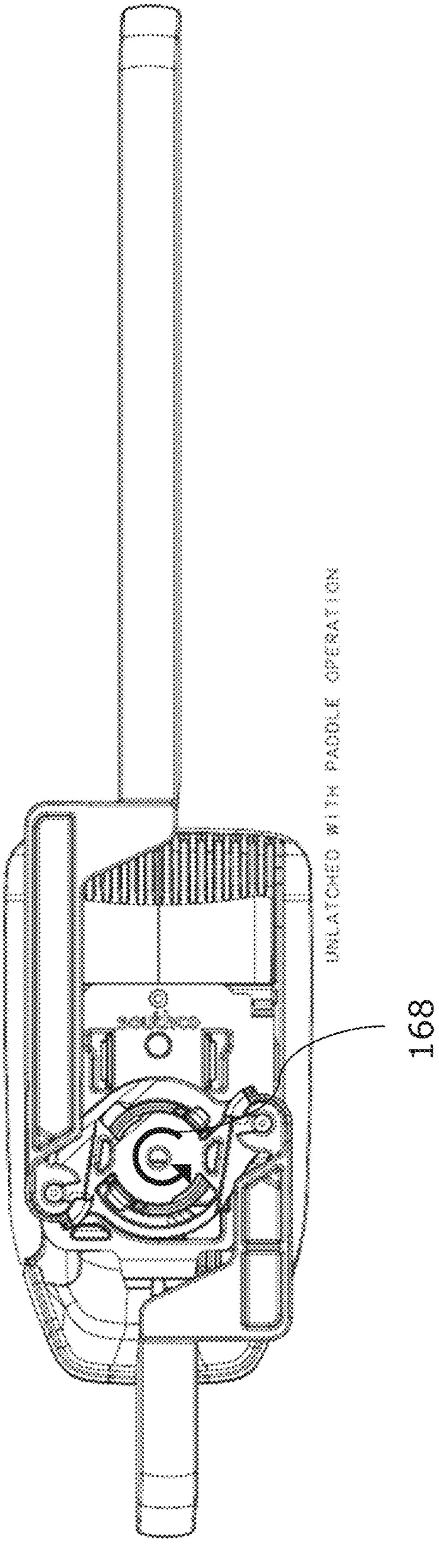
FIG. 5C is a top view of the vehicle glove box latch, wherein the vehicle glove box latch is shown in the unlatched state.
Figure 5D:
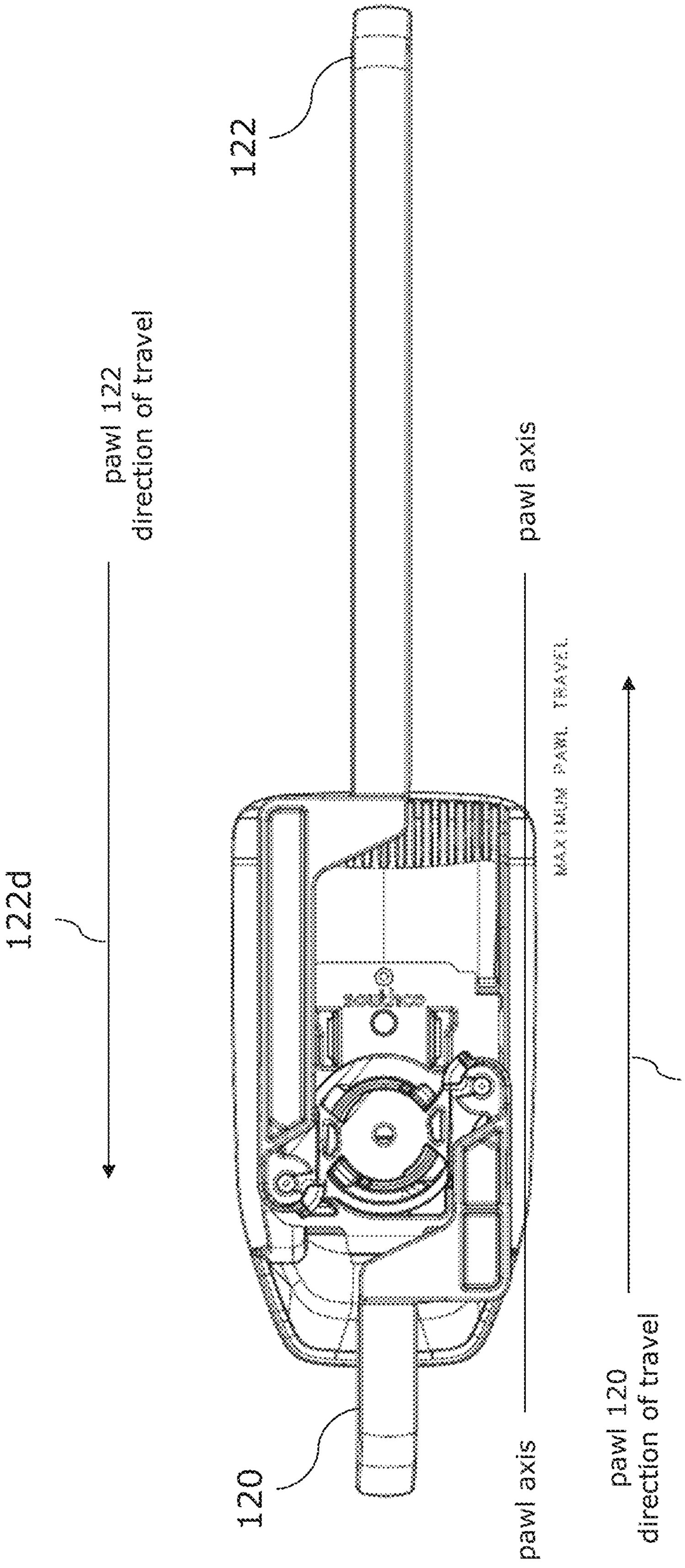
FIG. 5D is a top view of the vehicle glove box latch, showing a full travel distance of the pawl.

When the user rotates the paddle 116 against the biasing operation of the spring, the slots 140 slide over respective ribs of a housing (not shown), such that rounded leg 146 of the paddle 116 bears on a bearing surface (not shown) of the rotor 118, thereby urging the rotor 118 to rotate in the counterclockwise direction, as indicated by arrow 168 in FIG. 5C. The rotator 118 is free to rotate against the bias of the spring 150 in the counterclockwise direction since the coupling portions 120*b* and 122*b* of the pawls 120 and 122 are spaced a sufficient distance from retainer 132. Stated differently, the retainer 132 is not in a position to limit movement of the coupling portions 120*b* and 122*b* of the pawls 120 and 122 in the direction of the rotor axis (FIG. 7H). However, the retainer 132 remains in a position that permit the retainer 132 to resist unintended separation of the coupling portions 120*b* and 122*b* of the pawls 120 and 122 from one of the detents 126*a* and 126*b*, respectively, of the rotor 118 in the direction of the rotor axis (FIG. 7H).

Turning now to FIGS. 4A-4E, details of an unlatched and maximum pawl travel state of the latch 100 are illustrated. This state is substantially similar to the unlatched state of FIG. 5C, except that the pawls 120 and 122 are configured to be displaced at their respective maximum distance. In particular, the pawls 120 and 122 are configured to be displaced past the minimum distance at which the retainer 132 is not in a position to limit movement of the coupling portions 120*b* and 122*b* of the pawls 120 and 122 in the direction of the rotor axis (FIG. 7H). The tapered thicknesses of the pawls 120 and 122 allow for this maximum pawl travel, without adding further stress related to the relative motion of the components of vehicle glove box latch 100. This reduction of stress due or accommodation for relative motion of the components of the latch 100 can allow the latch 100 to withstand high frequency and repeated use, e.g. opening and closing of the vehicle glove box via unlatching and latching the vehicle glove box latch 100.

Additionally, or optionally, the pawls 120 and 122 are configured to be displaced past the minimum distance for permitting a more efficient assembly of latch 100 (an exemplary method of assembly is discussed further below). An inner or liner of the door 102 can be moved in to position, such that the pawls 120 and 122 are configured to be depressed inboard enough for the inner to be installed, i.e. the pawls 120 and 122 can move inside the door inner. Still further, the pawls 120 and 122 are configured to be displaced past the minimum distance, such that user operation of the latch 100 via the paddle 116 would not then move the pawls 120 and 122, such that the pawls 120 and 122 are retained or impeded by the door 102.

In another embodiment of the present invention, a vehicle glove box including the vehicle glove box latch 100 is disclosed. The components of the latch 100 is identical to the components described above. Further, the latch 100 may include plural pawls, such as plural pawls comprising one or more of pawls 120 and 122. A door, such as door 102, to which an actuator, such as paddle 116, and a rotor, such as rotor 118, are coupled may also be included. The rotor 118 may comprise plural detents, such as one or more of detents 126*a* and 126*b*. Each of the plural detents 126*a* and 126*b* may extend in the direction of the rotor axis (FIG. 7H) and into the respective recesses 124, as defined by the coupling portions 120*b* and 122*b* of a respective one of the plural pawls 120 and 122. The rotor 118 may also comprise plural retainers 132*a* and 132*b*, each of which is spaced from a respective one of the plural detents 126*a* and 126*b*. The plural retainers 132*a* and 132*b* may extend in the direction transverse to the rotor axis (FIG. 7H).

As noted elsewhere, latches according to aspects of this invention are not limited to a paddle operated system. For example, the design of the connection made to the rotor 118 could be used independent of an actuator comprising a paddle aspect, such as paddle 116. Accordingly, connections according to this invention could be used in any coupled system (e.g., a system including a rotator, spring, housing (base) and pawls) where the operation is through a more direct movement of a pawl, such as pawls 120 and 122. This could be done, for example, by pushing on pawls 120 and 122, pulling pawls 120 and 122, or some other mechanism that operates on pawls 120 and 122, and not the rotor 118.

Referring now to a method of assembling the vehicle latch assembly, the method 200 is described below with reference to the components of the vehicle glove box latch 100. The method 200 is desirable for easy assembly of the various components of the latch assembly, such as the vehicle glove box latch 100.

Figure 10:
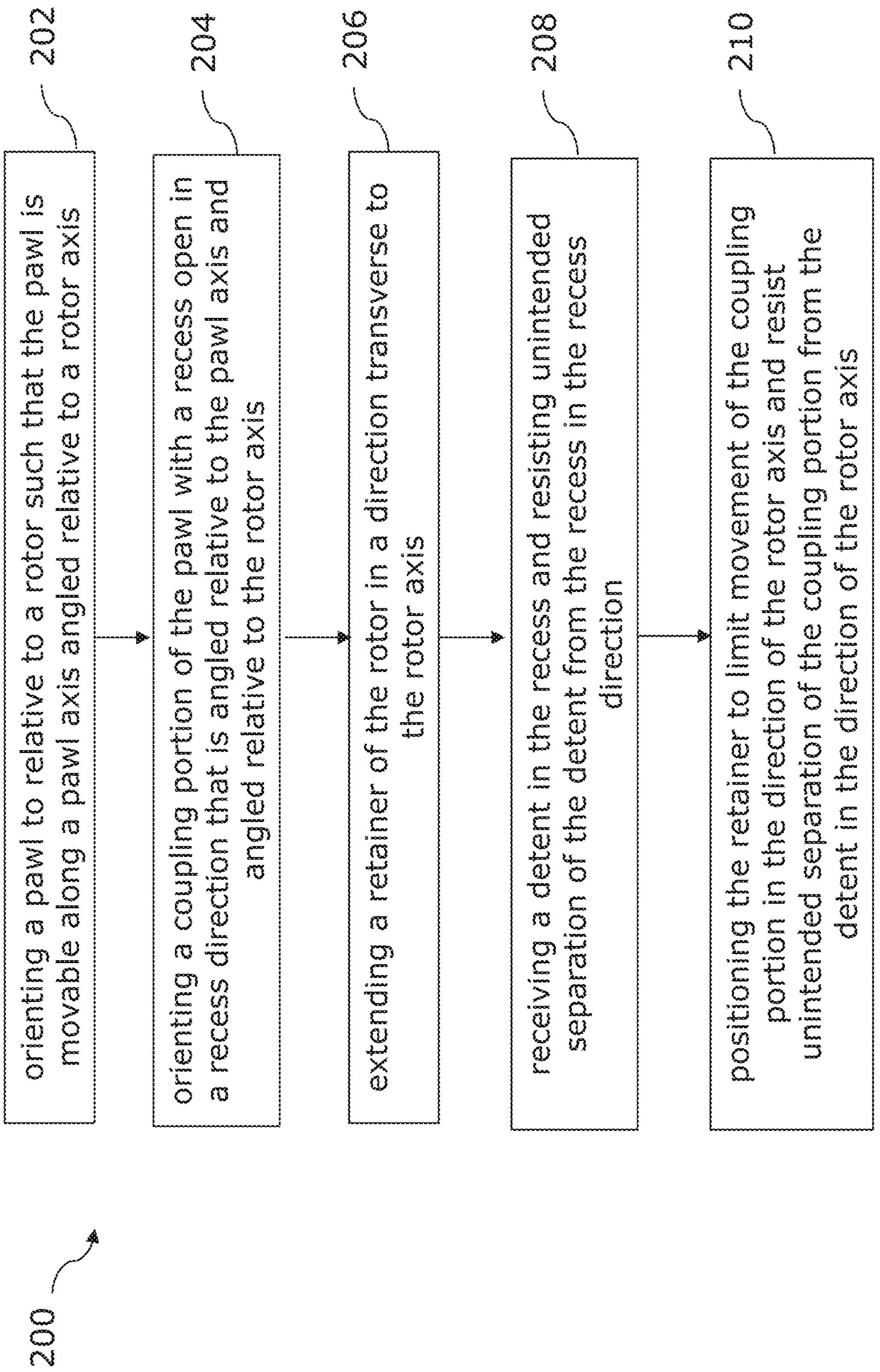
FIG. 10 depicts an exemplary method of assembling a latch assembly.

As illustrated in FIG. 10, step 202 of method 200 includes orienting the pawls 120 and 122 relative to rotor 118, such that the pawls 120 and 122 are movable along the pawl axis (FIG. 5D) angled relative to the rotor axis (FIG. 7H). In particular, one end of the opposing ends of the pawls 120 and 122 includes an engagement portion, such as free ends 120*a* and 122*a*, configured to be engaged with respective openings 176*a* and 176*b* (or collectively referred to as openings 176) in a vehicle in which the vehicle glove box is mounted, and another end of the opposing ends of the pawls 120 and 122 includes a coupling portion, such as coupling portions 120*b* and 122*b*, each of which are positioned for coupling the pawls 120 and 122, respectively, to the rotor 118. In a non-limiting example, as seen in FIGS. 1A-1B and 2A-2B, the pawl 120 is positioned through the aperture 112 of projection 108 on the door 102 and the pawl 122 is positioned through the aperture 114 of the projection 110.

In step 204, coupling portions 120*b* and 122*b* of the pawls 120 and 122 are oriented with a recess, such as recesses 124*a* and 124*b*, that are configured to open in a recess direction (FIG. 5A) that is angled relative to the pawl axis (FIG. 5D) and angled relative to the rotor axis (FIG. 7H).

In step 206, a retainer, such as retainers 132*a* and 132*b*, of the rotor 118 is extended in a direction transverse to the rotor axis (FIG. 7H).

In step 208, detents, such as one or both of the detents 126*a* and 126*b* of the rotor 118, are received in the recesses 124 defined by the coupling portions 120*b* and 122*b* of the pawls 120 and 122. The step 208 further comprises resisting unintended separation of the detents 126*a* or 126*b* of the rotor 118 from the recesses 124 in the recess direction (FIG. 5A). In an example, the detents 126*a* and 126*b* of the rotor 118, are each positioned into the recesses 124*a* and 124*b*, respectively. The recesses 124*a* and 124*b* are defined by the coupling portion 120*b* of the pawl 120 and the coupling portion 122*b* of the pawl 122, respectively. As discussed above, the detents 126*a* and 126*b* can be positioned or inserted into their respective recesses 124 in the recess direction (FIG. 5A). The mated orientation of the detents 126*a* and 126*b* in their respective recesses 124 prevents the detents 126*a* and 126*b* from inadvertently becoming detached from their recesses 124 in the recess direction (FIG. 5A).

In step 210, the retainer 132 of the rotor 118 is positioned to limit movement of the coupling portions 120*b* and 122*b* of the pawls 120 and 122 in the direction of the rotor axis (FIG. 7H) and resist unintended separation of the coupling portions 120*b* and 122*b* of the pawls 120 and 122 from the detents 126*a* or 126*b* of the rotor 118 in the direction of the rotor axis (FIG. 7H), thereby resisting unintended separation of the pawls 120 and 122 from the rotor 118 in the direction of the rotor axis (FIG. 7H) and in the respective recess directions 120*c* and 122*c*, each angled relative to the rotor axis (FIG. 7H).

Additionally, or optionally, the method 200 further comprises the step of mounting an actuator, such as paddle 116, for movement relative to the vehicle glove box. The rotor 118 may be further coupled to the paddle 116 and the rotor 118 may be mounted for rotation relative to the vehicle glove box about the rotor axis (FIG. 7H).

The method 200 may further comprise the step of positioning the at least one pawl, such as pawls 120 and 122, to interact with a striker for maintaining the latch assembly in a closed or latched state.

Method 200 may further include the step of orienting plural pawls, such plural pawls comprising one or more of pawls 120 and 122, relative to the rotor 118, such that the plural pawls comprising one or more of pawls 120 and 122, are movable along pawl axes that are angled relative to the rotor axis (FIG. 7H). In a non-limiting example, the plural pawls comprising one or more of pawls 120 and 122 are movable along pawl axes parallel to pawl directions 120*d* and 122*d* (FIG. 5D), respectively.

It should be understood that the above description of method 200, such as a method of assembling the vehicle glove box latch 100, is not limited to any step or sequence of steps, and may vary from that which is described without departing from the scope and spirit of the invention.

While preferred embodiments of the invention have been shown and described herein, it will be understood that such embodiments are provided by way of example only. Numerous variations, changes and substitutions will occur to those skilled in the art without departing from the spirit of the invention. For example, the latches described herein may be used for any compartment, and are not limited to a vehicle glove box. Accordingly, it is intended that the appended claims cover all such variations as fall within the spirit and scope of the invention.

What is claimed is:

1. A vehicle glove box latch for a vehicle glove box, the vehicle glove box latch comprising:

an actuator configured to be mounted for movement relative to the vehicle glove box;

a rotor coupled to the actuator and configured to be mounted for rotation relative to the vehicle glove box about a rotor axis; and a pawl coupled to the rotor and having opposing ends, the pawl being movable along a pawl axis angled relative to the rotor axis, one end of the opposing ends of the pawl including an engagement portion configured to be engaged with an opening in a vehicle in which the vehicle glove box is mounted, and another end of the opposing ends of the pawl including a coupling portion positioned for coupling the pawl to the rotor;

the coupling portion of the pawl defining a recess open in a recess direction angled relative to the pawl axis and angled relative to the rotor axis; and the rotor having a detent extending in a direction of the rotor axis and into the recess defined by the coupling portion of the pawl, the rotor also having a retainer spaced from the detent and extending in a direction transverse to the rotor axis;

wherein the recess defined by the coupling portion of the pawl has a diameter smaller than a diameter of the detent, such that an interface between the recess and the detent of the rotor permits the recess to receive the detent by exertion of an insertion force, to resist unintended separation of the detent of the rotor from the recess in the recess direction, and to permit intended separation of the detent of the rotor from the recess by exertion of a separation force opposite the insertion force; and wherein the retainer of the rotor is positioned to limit movement of the coupling portion of the pawl in the direction of the rotor axis and to resist unintended separation of the coupling portion of the pawl from the detent of the rotor in the direction of the rotor axis.

2. The vehicle glove box latch of claim 1, wherein the detent of the rotor is a stud extending in the direction of the rotor axis.

3. The vehicle glove box latch of claim 2, wherein the stud of the rotor is a cylindrical post.

4. The vehicle glove box latch of claim 1, wherein the retainer of the rotor includes a lip extending in a direction transverse to the rotor axis.

5. The vehicle glove box latch of claim 4, wherein the retainer includes a contact surface positioned proximal to or contacting the coupling portion of the pawl.

6. The vehicle glove box latch of claim 1, the pawl being movable along the pawl axis between a latched position and an unlatched position.

7. The vehicle glove box latch of claim 1, the coupling portion of the pawl having a rounded surface positioned for contact with the rotor, thereby reducing the area of direct contact between the pawl and the rotor.

8. The vehicle glove box latch of claim 1 comprising plural pawls.

9. The vehicle glove box latch of claim 8, the rotor having plural detents each extending in the direction of the rotor axis and into the recess defined by the coupling portion of a respective one of the plural pawls, the rotor also having plural retainers each spaced from a respective one of the plural detents and extending in the direction transverse to the rotor axis.

10. A vehicle glove box including the vehicle glove box latch of claim 1.

11. The vehicle glove box of claim 10, further comprising a user actuated paddle providing the actuator and a door to which the paddle and the rotor are coupled.

12. A vehicle glove box latch for a vehicle glove box, the vehicle glove box latch comprising:

an actuator configured to be mounted for movement relative to the vehicle glove box;

a rotor coupled to the actuator and configured to be mounted for rotation relative to the vehicle glove box about a rotor axis; and a pawl coupled to the rotor and having opposing ends, the pawl being movable along a pawl axis angled relative to the rotor axis, one end of the opposing ends of the pawl including an engagement portion configured to be engaged with an opening in a vehicle in which the vehicle glove box is mounted, and another end of the opposing ends of the pawl including a coupling portion positioned for coupling the pawl to the rotor, the pawl being movable along the pawl axis between a latched position and an unlatched position;

the coupling portion of the pawl defining a recess open in a recess direction angled relative to the pawl axis and angled relative to the rotor axis;

the rotor having a detent extending in a direction of the rotor axis and into the recess defined by the coupling portion of the pawl, the rotor also having a retainer spaced from the detent and extending in a direction transverse to the rotor axis;

wherein the recess defined by the coupling portion of the pawl is shaped to receive the detent of the rotor and to resist unintended separation of the detent of the rotor from the recess in the recess direction; and wherein the retainer of the rotor is positioned to limit movement of the coupling portion of the pawl in the direction of the rotor axis and to resist unintended separation of the coupling portion of the pawl from the detent of the rotor in the direction of the rotor axis;

wherein the coupling portion of the pawl has a tapered thickness such that a distance between the coupling portion of the pawl and the contact surface of the retainer is greater in the unlatched position of the pawl relative to a distance between the coupling portion of the pawl and the contact surface of the retainer in the latched position of the pawl.

13. The vehicle glove box latch of claim 12, the rotor being movable about the rotor axis between a latched position and an unlatched position.

14. The vehicle glove box latch of claim 13, the contact surface of the retainer of the rotor being moved relative to the coupling portion of the pawl when the rotor is moved about the rotor axis between the latched position and the unlatched position.

15. A vehicle glove box latch for a vehicle glove box, the vehicle glove box latch comprising:

an actuator configured to be mounted for movement relative to the vehicle glove box;

a rotor coupled to the actuator and configured to be mounted for rotation relative to the vehicle glove box about a rotor axis; and a pawl coupled to the rotor and having opposing ends, the pawl being movable along a pawl axis angled relative to the rotor axis, one end of the opposing ends of the pawl including an engagement portion configured to be engaged with an opening in a vehicle in which the vehicle glove box is mounted, and another end of the opposing ends of the pawl including a coupling portion positioned for coupling the pawl to the rotor;

the coupling portion of the pawl defining a recess open in a recess direction angled relative to the pawl axis and angled relative to the rotor axis;

the rotor having a detent extending in a direction of the rotor axis and into the recess defined by the coupling portion of the pawl, the rotor also having a retainer spaced from the detent and extending in a direction transverse to the rotor axis;

wherein the recess defined by the coupling portion of the pawl is shaped to receive the detent of the rotor and to resist unintended separation of the detent of the rotor from the recess in the recess direction; and wherein the retainer of the rotor is positioned to limit movement of the coupling portion of the pawl in the direction of the rotor axis and to resist unintended separation of the coupling portion of the pawl from the detent of the rotor in the direction of the rotor axis;

wherein the coupling portion of the pawl has a rounded surface positioned for contact with the rotor, thereby reducing the area of direct contact between the pawl and the rotor, and wherein a surface of the recess of the coupling portion of the pawl is rounded to reduce the area of direct contact between the recess of the coupling portion of the pawl and the detent of the rotor.

16. A method for assembling a vehicle latch assembly, the method comprising:

orienting a pawl relative to a rotor such that the pawl is movable along a pawl axis angled relative to a rotor axis, one end of the opposing ends of the pawl including an engagement portion configured to be engaged with an opening in a vehicle in which the vehicle glove box is mounted, and another end of the opposing ends of the pawl including a coupling portion positioned for coupling the pawl to the rotor;

orienting the coupling portion of the pawl with a recess open in a recess direction angled relative to the pawl axis and angled relative to the rotor axis;

extending a retainer of the rotor in a direction transverse to the rotor axis;

receiving a detent of the rotor in the recess defined by the coupling portion of the pawl by exertion of an insertion force, the recess having a diameter smaller than a diameter of the detent, resisting unintended separation of the detent of the rotor from the recess in the recess direction, and permitting intended separation of the detent of the rotor from the recess by exertion of a separation force opposite the insertion force;

positioning the retainer of the rotor to limit movement of the coupling portion of the pawl in the direction of the rotor axis and resist unintended separation of the coupling portion of the pawl from the detent of the rotor in the direction of the rotor axis;

thereby resisting unintended separation of the pawl from the rotor in the direction of the rotor axis and in the recess direction angled relative to the rotor axis.

17. The method of claim 16, further comprising mounting a user operated paddle for movement relative to the vehicle glove box.

18. The method of claim 17, further comprising coupling the rotor to the paddle and mounting the rotor for rotation relative to the vehicle glove box about the rotor axis.

19. The method of claim 16, further comprising positioning the pawl to interact with a striker for maintaining the latch assembly in a closed state.

20. The method of claim 16, further comprising plural pawls and orienting the plural pawls relative to the rotor such that the pawls are movable along pawl axes angled relative to the rotor axis.

* * * * *